June 14, 1960

W. F. MARANTETTE ET AL 2,941,136

DIGITAL SERVOMOTOR CONTROL SYSTEM

Filed Sept. 23, 1957

INVENTORS:
William F. Marantette
Ruth B. Marantette

By Smyth & Roston
Attorneys

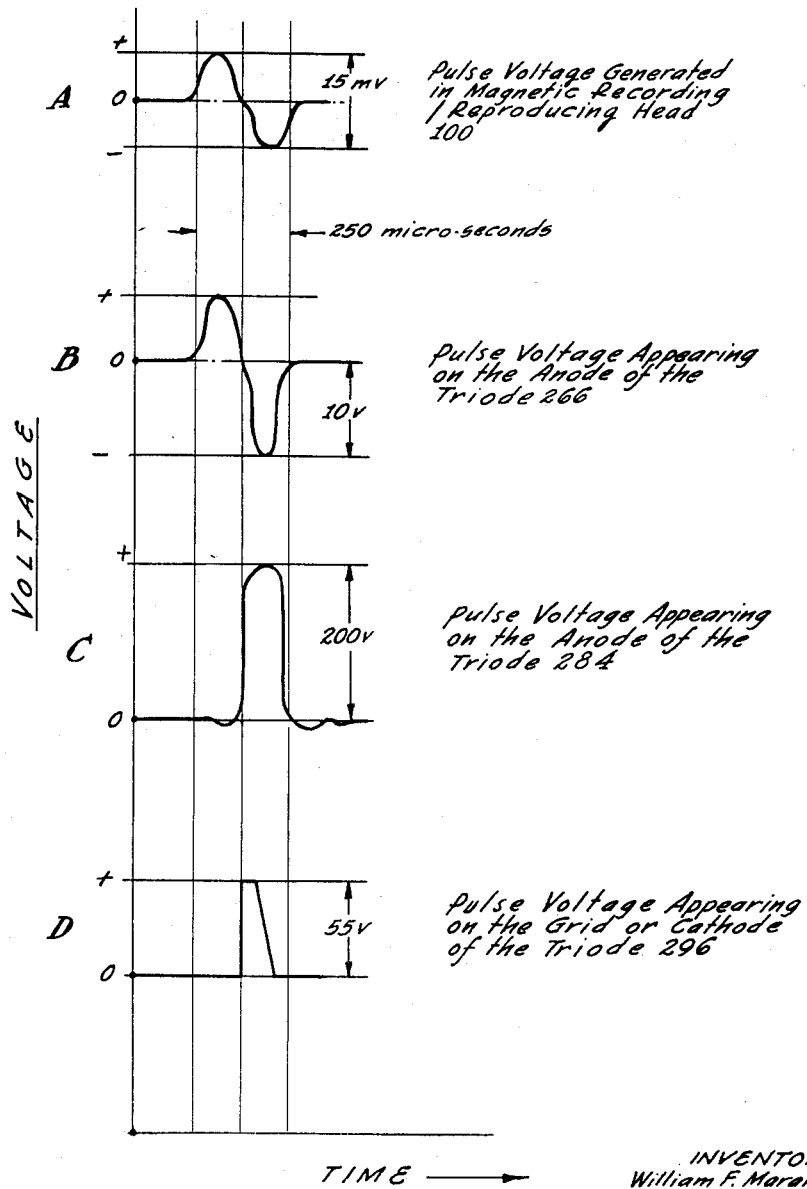

United States Patent Office 2,941,136
Patented June 14, 1960

2,941,136
DIGITAL SERVOMOTOR CONTROL SYSTEM

William F. Marantette and Ruth B. Marantette, Manhattan Beach, Calif., assignors to Micro-Path Inc., Los Angeles, Calif., a corporation of Delaware Filed Sept. 23, 1957, Ser. No. 685,504

28 Claims. (Cl. 318—32)

The present invention relates to a system for controlling a servo system or the like in accordance with data recorded in digital form on a recording medium, such as a magnetic tape.

The invention is particularly suited for the control of machine tools, and it will be described in that environment. It will become evident as the description proceeds, however, that the invention may be used whenever exactly repeated cycles of a series of rotational motions are required.

In order to control a machine tool automatically, it is necessary that the cutting element of the tool be capable of automatic cycling. It is also essential for the workpiece to be susceptible of automatically controlled movement. Many types of present day machine tools are equipped to have their cutting elements automatically cycled. The present invention may be used in conjunction with such machines to control the movements of successive workpieces through identical operational patterns.

To place the control of the present invention in operation, a workpiece is positioned on a work table, and the work table is controlled for motion along two perpendicular axes. This control is from data recorded on a magnetic tape or any other suitable recording medium. The controlled work table is adapted to repeat a series of operations for successive workpieces so that a particular operational pattern may be duplicated from one workpiece to another.

The work table may be driven along a co-ordinate axis by a first servomotor, and it may be driven along an ordinate axis by a second servomotor. It is apparent that the appropriate control of the clockwise and counterclockwise rotation of each of the two servomotors can cause the work table to be moved in a particular plane in accordance with any conceivable pattern.

The control of the work table by the system of the invention from recorded data enables the machine tool to perform a series of pre-conceived operations on the workpiece that is supported by the table at any particular time. The re-cycling of the recorded data enables the same series of operations to be precisely and accurately duplicated on each of a plurality of successive workpieces.

As noted above, the automatic control of a machine tool represents but one of many uses for the system of the invention. The system will find ready application wherever a control pattern of a mechanism is to be repeated exactly a number of times.

For the control of any particular servomotor, the system of the invention makes use of two independent sets of data. These data may be recorded, for example, in two separate channels on a magnetic tape. One channel of data is used to control the clockwise rotation of the servomotor, and the other channel of data is used to control the counterclockwise rotation. As described in detail in copending application Serial No. 685,503, filed September 23, 1957, by us, these data are preferably recorded in each channel in the form of pulses or generally in digital form.

The recorded pulses in the two channels are fed to a unique counter which is incorporated into the system of the invention. This counter is basically a digital-to-rotational converter and it responds to the pulses to transform them into equivalent mechanical rotational movements. The rotational element of the counter is controlled by the clockwise and counterclockwise pulses recorded on the tape. This element assumes at any time an angular position dictated by the recorded pulses.

The conversion of digital data to rotational motion by the instrumentality to be described constitutes an important feature of the invention. This is because it permits simplifications in the system as compared to the prior art systems of this general type. It also permits a most precise and accurate control of the servomotor to be realized.

The mechanical power developed by the counter of the invention is relatively small. This means that the counter cannot be conveniently mechanically coupled to the servomotor to be controlled. Another feature of the invention is the provision of an improved coupling unit requiring practically no power from the counter for slaving the servomotor to the rotational element of the counter.

The coupling unit mentioned immediately above includes a differential transformer having a core element which is mechanically coupled to the rotational element of the counter. Actuation of the counter upsets the balance in the transformer circuit. The latter circuit is connected to the control system for the controlled servomotor, and this unbalance causes the servomotor to be energized. The servomotor is energized to produce rotational motion in the direction determined by the direction of the unbalance in the transformer circuit.

The controlled servomotor is also coupled to the core of the differential transformer, and when the servomotor is energized this coupling is such to return the transformer circuit to its balanced condition. In this manner, the servomotor can be controlled to assume an angular position which at all times corresponds to the angular position of the rotational element of the counter and without placing a load on the counter.

The servomotor itself can be almost any type such as an alternating current or direct current electric servomotor. It may also be an hydraulic motor, an hydraulic cylinder, an air motor, and so on. The major criterion is that the motor be capable of being accurately controlled.

In the drawings which are illustrative merely of one possible embodiment of the invention:

Figure 2:
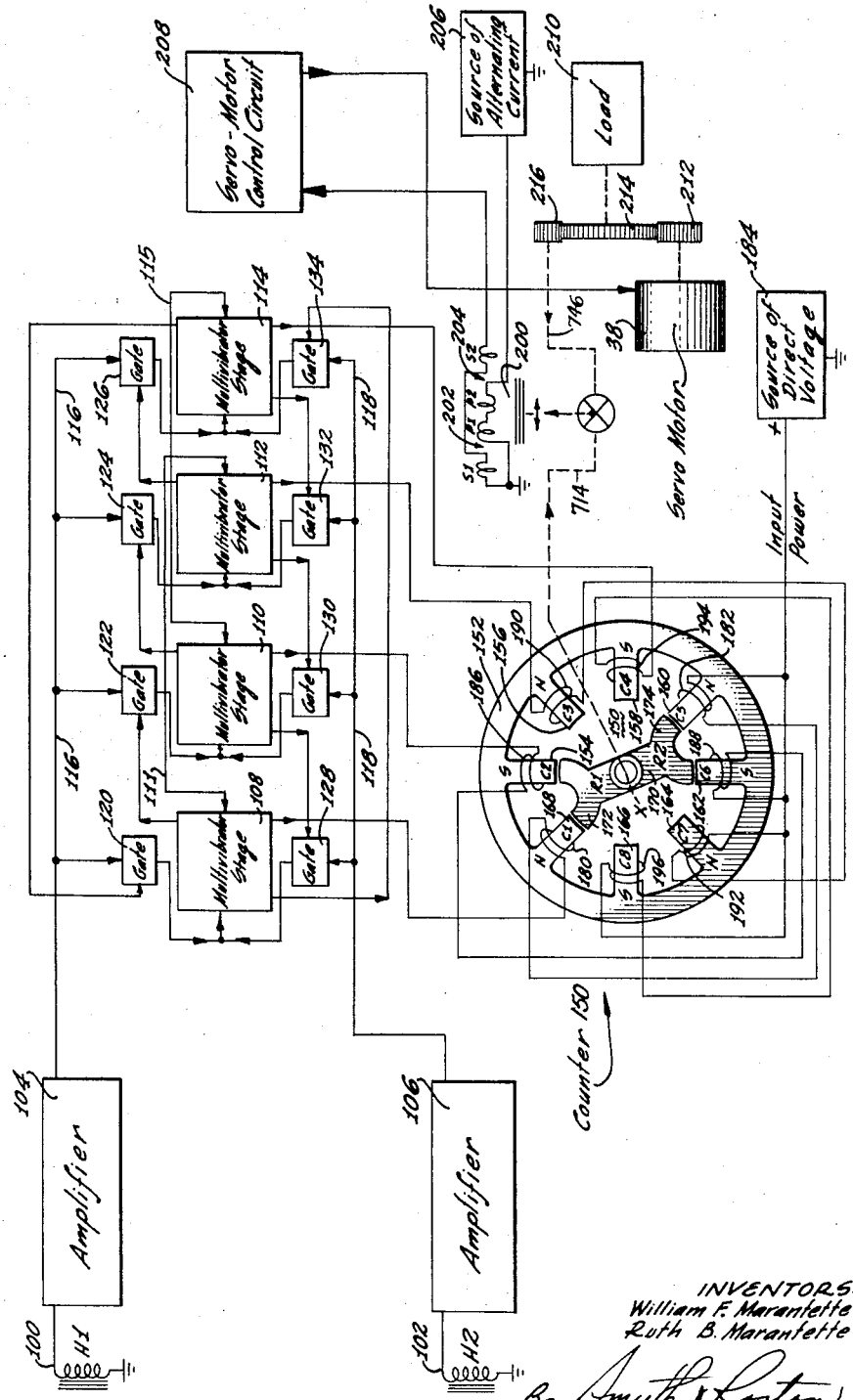
Figure 2 is a schematic representation of the control system of the invention in which the various components of the control system are shown in a simplified block form, this view also showing the rotational converter or counter of the invention in a simplified form and the differential transformer circuit which is used to couple the counter to a controlled servomotor.
Figure 3:
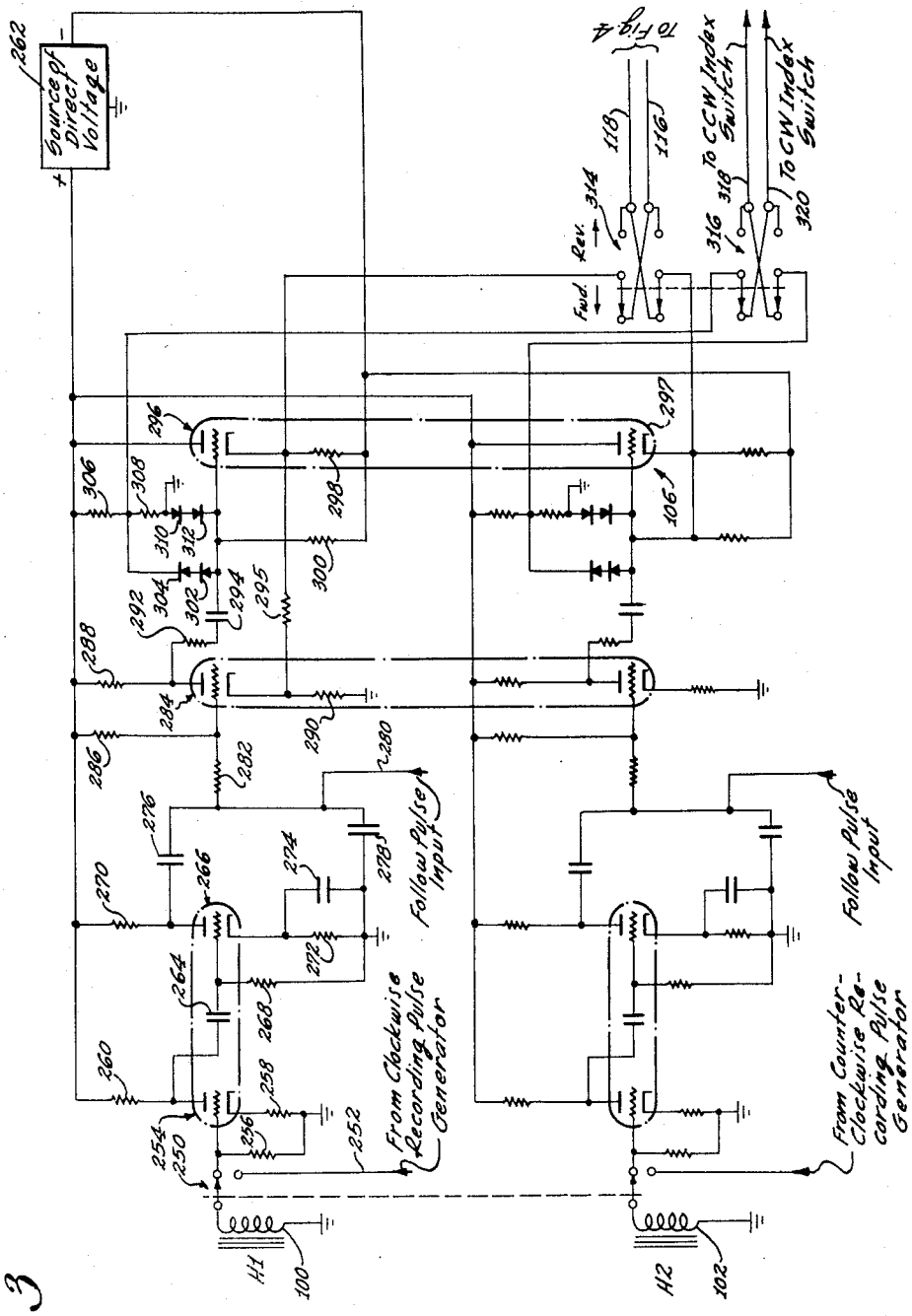
Figure 4:
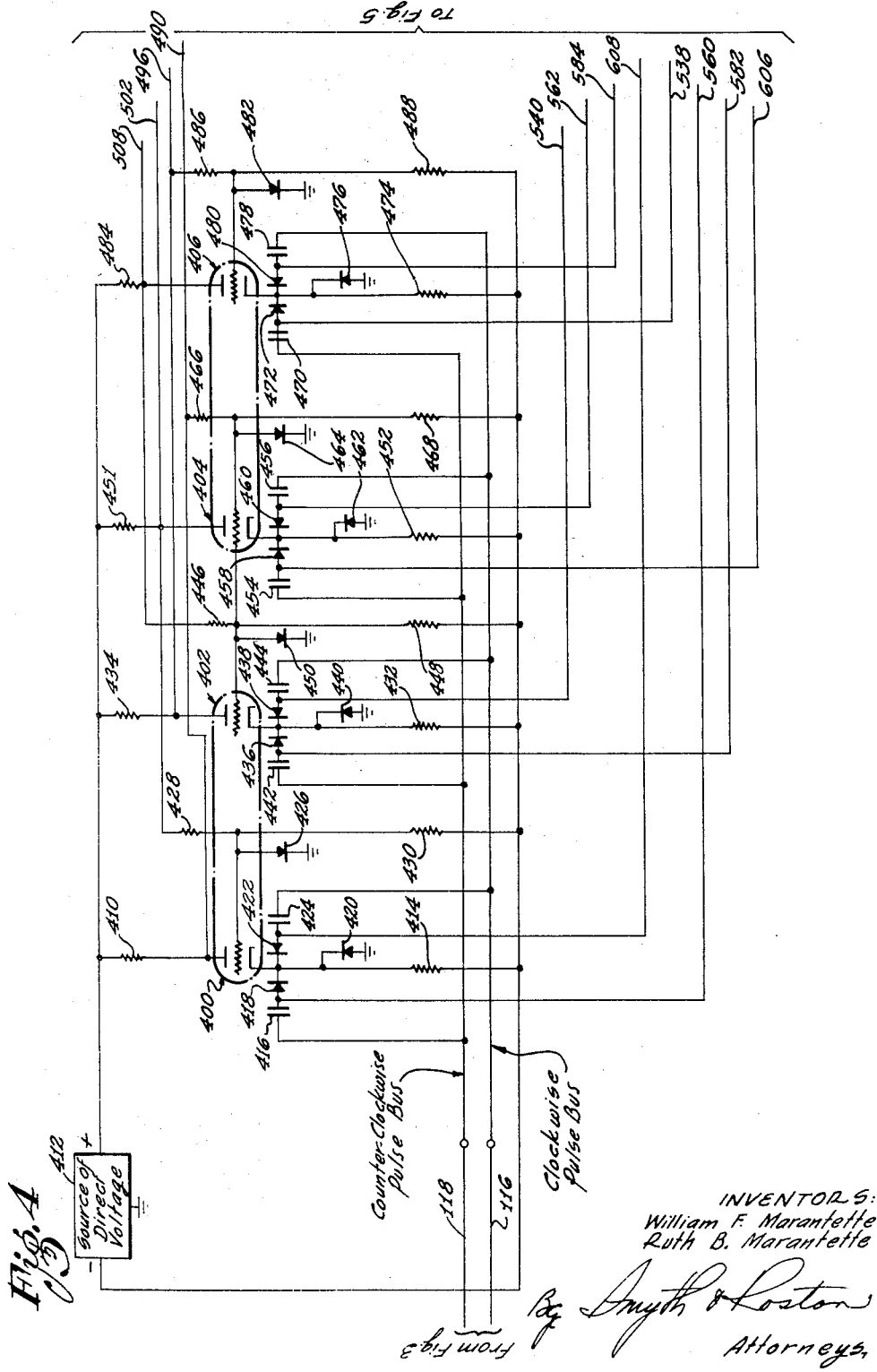
Figure 5:
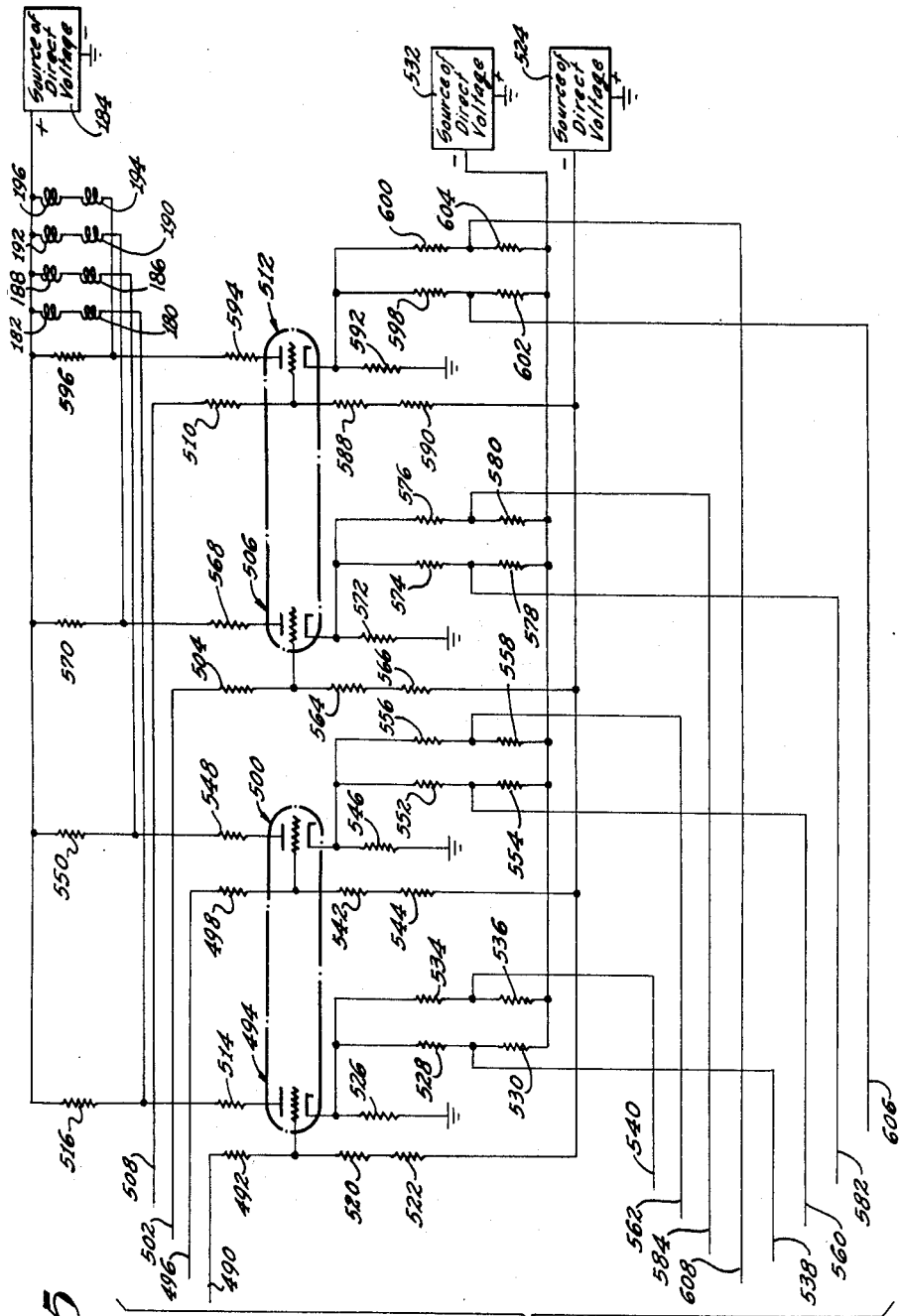
Figure 6:
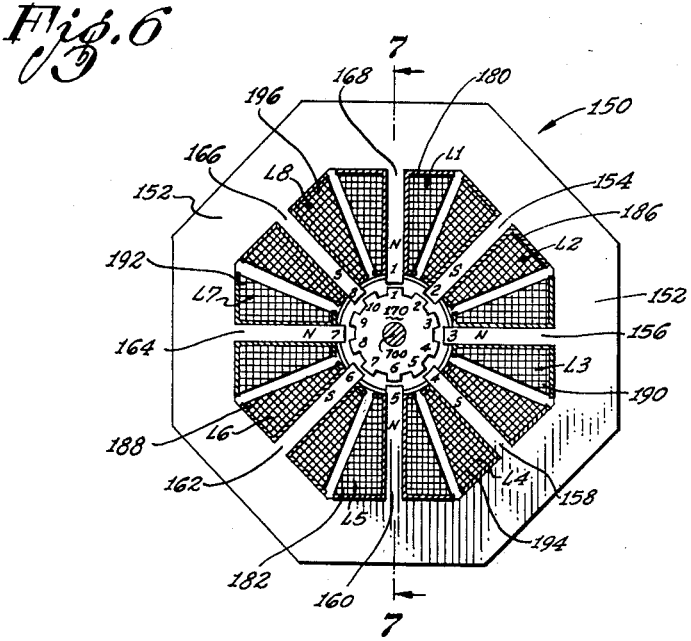
Figure 7:
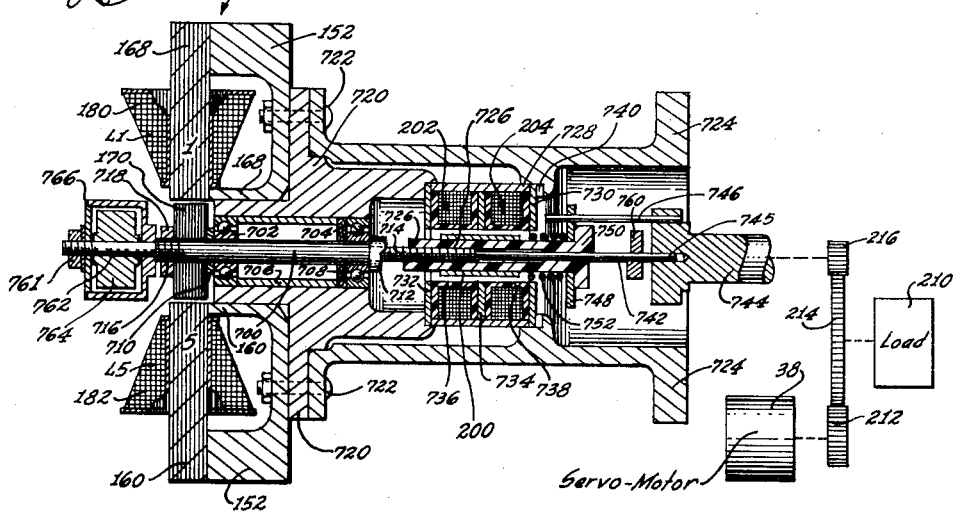

Figure 3 is a detailed circuit representation of a pair of amplifiers shown in Figure 2 in block form and as interposed between respective ones of a pair of electromagnetic pickup heads and the counter, these amplifiers functioning to amplify and shape recorded pulses sensed by the pickup heads and also serving as an appropriate impedance match between the pickup heads and the other portions of the control system;

Figure 4 is a detailed electrical circuitry including a pair of bi-stable multi-vibrator networks and their associated gates, this circuitry being used to drive the counter portion of the control system of the invention and being interconnected to form a quadra-stable multi-vibrator;

Figure 5 is a circuit diagram of a plurality of driver stages interposed between the multi-vibrator of Figure 4 and the counter portion of the control system;

Figure 6 is an end view of the digital-to-rotational converter or counter constructed in accordance with one embodiment of the invention, this view showing a series of electrically activated stator poles and a rotational element which is rotated to selected angular positions in accordance with the activation of the stator poles;

Figure 7 is a side sectional view of the counter of Figure 6 as seen substantially on the line 7—7 of Figure 6, the view of Figure 7 also showing a differential transformer arrangement for coupling the converter to a controlled servomotor; and Figure 8 is a series of curves useful in explaining the operation of the system of the invention.

Figure 1:
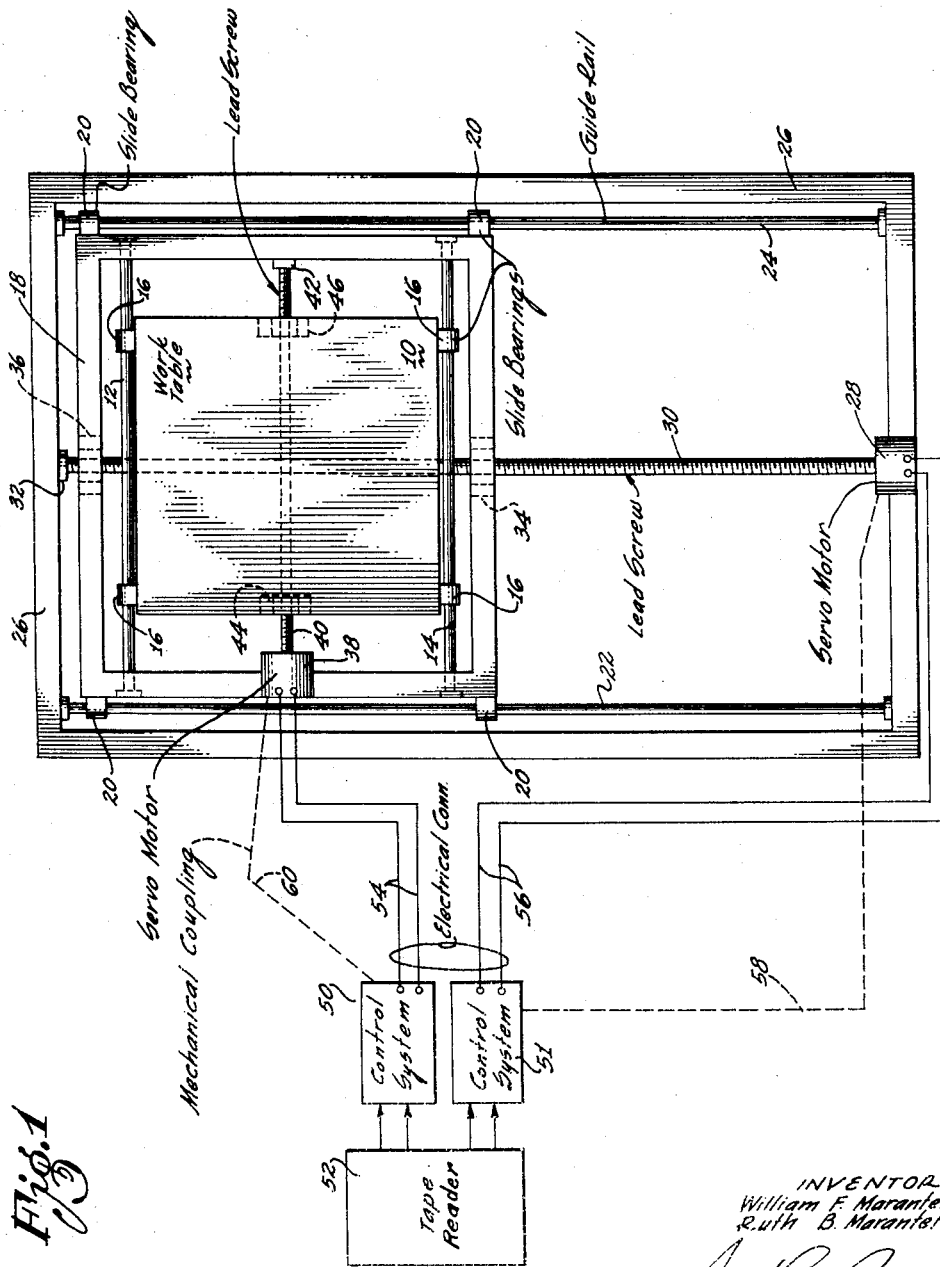
Figure 1 is a schematic top plan view of a work table adapted to be controlled by the control system of the invention and of a pair of servomotors for controlling the motion of the table in a particular plane and also shows in block form the control system of the invention and the mechanical and electrical coupling of the control system to the servomotors.

The system of Figure 1 includes a work table 10 adapted to support the workpieces on which machine-tool operations are to be performed. As described above, the work table 10 is moved through a pre-set series of operations for the workpiece supported on it so that a machine tool may perform desired operations on the workpiece. The operational pattern for the workpiece is precisely repeated for each of the plurality of successive workpieces supported on the work table 10.

The work table is supported for co-ordinate reciprocal motion on a pair of guide rods 12 and 14 and by means of a series of slide bearings 16. The guide rods 12 and 14 extend in the co-ordinate direction along opposite edges of the work table 10. The slide bearings 16 are secured to the edges of the work table and they may have any suitable known construction. These slide bearings permit the work table to slide freely back and forth along the co-ordinate axis.

The guide rods 12 and 14 are supported at their opposite ends in a frame 18. The frame 18 has a plurality of slide bearings 20 secured to its opposite edges, and these slide bearings are supported by a pair of guide rods 22 and 24. The guide rods 22 and 24 extend in a direction perpendicular to the guide rods 12 and 14, and the slide bearings 20 permit the frame 18 to be moved in an ordinate direction perpendicular to the direction of movement of the work table 10 on the guide rods 12 and 14. The guide rods 22 and 24 are supported at their opposite ends in a suitable stationary frame 26.

A first servomotor 28 is supported on the frame 26. This first servomotor drives a threaded rod or lead screw 30, the lead screw being rotatably supported at its remote end in a bearing 32 which is secured to the frame 26. The lead screw 30 extends parallel to the guide rods 22 and 24. This lead screw threadedly engages a pair of bushings 34 and 36 which are secured to the frame 18. The arrangement is such that clockwise rotation of the servomotor 28 rotates the lead screw 30 in one direction to drive the frame 18 in a particular direction along the ordinate axis. Likewise, counterclockwise rotation of the servomotor 28 causes the frame 18 to move in the opposite direction along the ordinate axis.

A second servomotor 38 is mounted on the frame 18, and this servomotor is coupled to a lead screw 40 which extends across the frame 18 perpendicular to the lead screw 30. The lead screw 40 is rotatably mounted at its free end in a bearing 42 which is fastened to the frame 18. The lead screw 40 engages a pair of bushings 44 and 46 in a threadable manner, these bushings being mounted on the work table 10.

Therefore, the rotational motion imparted to the lead screw 40 by the servomotor 38 in a clockwise direction causes the work table 10 to move along the co-ordinate axis in the frame 18 in a particular direction. Also, the counterlockwise rotation of the lead screw 40 by the servomotor 38 causes the work table 10 to move in the opposite direction along the co-ordinate axis.

It is apparent, therefore, that the appropriate control of the servomotors 38 and 28 can cause these motors to move the work table 10 in accordance with any desired operational pattern with respect to the fixed frame 26.

The control systems of the present invention are represented in Figure 1 by blocks 50 and 51. These systems respond to the recorded data on the tape of a tape reader designated by the block 52. As mentioned previously, the recorded data is preferably in digital form with one series of pulses in one channel representing the clockwise motion of the servomotor 38, a second series in a second independent channel representing the counterclockwise rotation of the servomotor 38, a third series in another channel representing the clockwise rotation of the servomotor 28, and a fourth series in yet another channel representing the counterclockwise rotation of the servomotor 28.

The control system 50 of the invention responds to the first and second series of recorded pulses to provide the equivalent control over the operation of the servomotor 38 through the electrical connection 54 extending from the control system to the servomotor. As will be described, the servomotor 38 is also mechanically coupled to the control system 50, as indicated by the dashed line 60, this mechanical coupling serving to restore a null point in the control system when the servomotor 38 has been actuated to its desired position.

As will be described in detail, the control system 50 is capable of responding to the data recorded on the tape in the tape reader 52 to precisely control the servomotor 38 so that the work table 10 is moved through a series of motions determined by the recorded data. The system of Figure 1, of course, represents one of many controls to which the control system 50 may be placed.

In like manner, the control system 51 receives the third and fourth series of pulses from the tape reader 52 and provides a control over the operation of the servomotor 28 in accordance with the pattern of occurrence of the third and fourth series of pulses. As shown in Figure 1, the servomotor 28 drives the work table 10 in a direction substantially perpendicular to the direction in which the servomotor 38 drives the work table. The control system 51 provides a control over the operation of the servomotor 28 through the electrical leads 56, and the servomotor 28 in turn operates through a mechanical coupling indicated by dashed lines 58 in Figure 1 to restore the control system to a null state in accordance with the operation of the servomotor.

However, it should be appreciated that the servomotor 38 may drive the work table 10 along any axis transverse to that in which the servomotor 28 drives the work table. For example, each of the servomotors 28 and 38 may drive the work table 10 along transverse axes extending in Figure 1 from a lower corner to the opposite upper corner. Similarly, the servomotors 28 and 38 may operate to drive the work table 10 along axes representing polar co-ordinates in which one axis represents a radius and the other angle represents an arc.

It should be appreciated that the work table 10 can be driven in more frames of reference at any instant than those provided by the servomotors 28 and 38. For example, the work table 10 can be driven in three substantially perpendicular directions by including a control system and servomotor similar to those described above and by having the additional control system and servomotor drive the work table in a direction perpendicular to the plane of the paper in Figure 1. It should be further appreciated that the work table 10 is shown only by way of example and that actually any other suitable type of output mechanism can be used.

As noted previously, the actual data on the tape in the tape reader 52 may be recorded in the manner described in the copending application Serial No. 685,503. In accordance with one of the described recording techniques, the work table 10 may be controlled by the manual adjustment of potentiometers controlling the activation of the servomotors 28 and 38. This manual adjustment may be such that the work table 10 is moved through a sequence of operations while an associated machine tool performs various desired operations on a supported workpiece. While this is taking place, the equivalent data is being recorded on the tape in the reader 52. Then, the data may be used in a manner to be described precisely to duplicate the sequence of operations on each of a plurality of successive workpieces supported by the work table 10.

The control system in Figure 2 is shown as coupled to a first dual electro-magnetic reading head 100 and to a second dual electro-magnetic pickup reading head 102. These heads are included in the tape reader 52 of Figure 1 and they may have any known construction. The head 100 is positioned to scan a particular channel of the magnetic tape in the tape recorder on which the clockwise rotational digital data for the servomotor 38. In like manner, the pickup head 102 is associated with a second independent channel on which the counterclockwise digital data for that servomotor is recorded. It will be appreciated that the apparatus and system shown in Figure 2, which will be described in more detail in conjunction with the subsequent figures, is suitable to control either one of the servomotors 28 or 38 in Figure 1. Similar apparatus may be used to control the other servomotor. It should also be appreciated that other similar apparatus may be used to control the operation of servomotors which are instrumental in moving a machine tool or any other type of output mechanism or load through complex movements.

One terminal of the head 100 is grounded, and the other is connected to an amplifier 104. This amplifier, in addition to amplifying the control pulses from the head 100 also serves to shape these pulses and to provide an appropriate impedance to match with the subsequent stages in the system. In like manner, the head 102 has one of its terminals grounded, and the other terminal of this latter head is connected to an amplifier 106. The amplifier 106, likewise, serves to shape and amplify the control pulses from the head 102, and this latter amplifier also serves as an impedance match between the head 102 and the subsequent stages of the system.

The system of Figure 2 includes two, aperiodic bi-stable multivibrators or flip-flops each having two stages. One of the bi-stable multivibrators is formed by stages 108 and 112 in Figure 2 and the other bi-stable multi-vibrator is formed by stages 110 and 114 in that figure. The bi-stable multi-vibrators are shown in Figure 2 in their separate stages 108, 110, 112 and 114 to facilitate the subsequent discussion and the understanding of the invention. The coupling between the stages 108 and 112 to form a first bi-stable multi-vibrator is indicated by a lead 111, and the coupling between the stages 110 and 114 to form a second bi-stable multi-vibrator is indicated by a lead 115. These multi-vibrator stages will be described in detail subsequently, and they are connected together to form a quadra-stable multi-vibrator network.

The amplifier 104 has its output terminal connected to a lead 116, and the amplifier 106 has its output terminal connected to a lead 118. The lead 116 is connected to each of a plurality of gate networks 120, 122, 124 and 126. In like manner, the lead 118 is connected to a plurality of gate networks 128, 130, 132 and 134.

The gates 120 and 122 are connected respectively to input terminals of the multi-vibrator stages 108 and 110. Likewise, the gates 124 and 126 are connected to respective input terminals of the multi-vibrator stages 112 and 114. Likewise, the gates 128, 130, 132 and 134 are connected to respective input terminals of the multi-vibrator stages 108, 110, 112 and 114.

The multi-vibrator stage 108 has a pair of output terminals which are connected respectively to the gates 122 and 134 to control these gates. Likewise, the multi-vibrator stage 110 has a pair of output terminals connected respectively to the gates 124 and 128; the multi-vibrator stage 112 has a pair of output terminals connected respectively to the gates 126 and 130; and the multi-vibrator stages 114 has a pair of output terminals connected respectively to the gates 120 and 132.

The multi-vibrator stage 108 is inter-coupled with the multi-vibrator stage 112, as indicated by the lead 111, so as to form a first bi-stable multi-vibrator. Similarly, the bistable multi-vibrator stage 110 is inter-coupled with the multi-vibrator stage 114, as indicated the lead 115, so as to form a second bi-stable multi-vibrator. This inter-coupling is such that whenever the multi-vibrator stage 108 is energized, the multi-vibrator stage 112 is de-energized, and vice versa. Similarly, whenever the multi-vibrator stage 110 is energized, the multi-vibrator stage 114 is de-energized, and vice versa.

The digital-to-rotational converter or counter is shown in Figure 2 in schematic form for purposes of explanation. The counter is represented generally as 150 and it comprises an annular magnetic core 152. This core includes a plurality of pole pieces 154, 156, 158, 160, 162, 164, 166 and 168. These pole pieces are integral with the annular core 152 and they extend inwardly from the core 152 at equi-distant angular positions around a central rotational axis X of the unit. The assembly includes a rotational member or rotor 170 which is adapted to rotate about the axis X. The rotor 170 is composed of magnetic material and it serves to complete the magnetic circuit between respective adjacent ones of the pole pieces. For example, the rotor 170 may have a first end portion 172 which is shaped to bridge adjacent pairs of the radial pole pieces, and the rotor may have an opposite end portion 174 which is shaped to bridge adjacent pairs of the radial pole pieces which are diametrically opposite the pairs bridged by the end portion 172. It should be appreciated that the construction of the rotor 170 as described above and shown in Figure 2 may be considered as being schematic and that actually the rotor is preferably provided with a plurality of pole pieces as shown in Figure 6 and described subsequently.

The multi-vibrator stage 108 has an output terminal which is connected to one terminal of a coil 180, the coil being wound about the pole piece 168. The other terminal of the coil 180 is connected to a first terminal of a coil 182, the latter coil being wound on the pole piece 160. The coils 180 and 182 are shown in Figures 2 and 5 as being connected in series, but they may also be connected in parallel or in any other electrical relationship to obtain simultaneous energizing of the coils. In the series relationship of the coils 180 and 182 the second terminal of the coil 182 is connected to the positive terminal of a source of direct voltage 184. The negative terminal of this source is grounded.

A coil 186 is wound on the pole piece 154, and this coil is connected to a coil 188 on the pole piece 162. These two coils are shown in Figure 2 as being connected in series between an output terminal of the multi-vibrator stage 110 and the positive terminal of the source 184. The multi-vibrator stage 112 has an output terminal which is connected to one terminal of a coil 190 on the pole piece 156. This latter coil is shown in Figure 2 as being connected in series with a coil 192 on the pole piece 164, and the latter coil is connected to the positive terminal of the source 184. The coils 186 and 188 may be connected in parallel or in any other suitable relationship to obtain a simultaneous energizing of the coils, and the coils 190 and 192 may be connected in a similar relationship.

In like manner, a coil 194 mounted on the pole piece 158 is shown in Figure 2 as being connected in series with a coil 196 on the pole piece 166. The terminal of the coil 194 remote from the coil 196 is connected to an output terminal of the multi-vibrator stage 114, and the terminal of the coil 196 remote from the coil 194 is connected to the positive terminal of the source 184. The coils 194 and 196 may also be connected in parallel or in any other suitable relationship.

The rotor 170 of the counter 150 is mechanically coupled to the common core 200 of a pair of transformers 202 and 204. These transformers are connected in differential manner, the primary windings being connected in differential series between one of the terminals of a source of alternating current 206 and ground. The secondary windings of the transformers 202 and 204 are connected in series aiding relationship between the input terminal of a servomotor control circuit 208 and ground.

Rotation of the rotor 170 of the counter causes the core 200 to move in a rectilinear manner from a null point with respect to the transformers 202 and 204. Rotation of the rotor in one direction causes the core 200 to shift in a first direction so that the series-connected secondary windings of the transformer develop a voltage having a particular phase and having an amplitude corresponding to the amount the core is deflected. Alternately, the opposite rotation of the rotor 170 causes the core 200 to move in the opposite direction. This latter motion of the core 200 causes an oppositely phased voltage to appear across the series connected secondary windings. This latter voltage also has an amplitude which corresponds to the amount the core 200 is shifted from its null position.

The output terminal of the control circuit 208 is connected, for example, to the servomotor 38 to activate that motor. The servomotor drives any appropriate load 210 through a pair of gears 212 and 214. A feedback gear 216 meshes with the gear 214. This feedback gear is mechanically coupled to the movable core 200 of the transformers. The arrangement is such that as the servomotor 38 is activated as a result of the movement of the core 200 by the rotor 170, the resulting activation of the servomotor 38 causes the core to be returned to its null point after the servomotor has shifted the load 210 to a new position corresponding to the angular position of the rotor 170.

The pulses recorded on the different channels of the magnetic tape are sensed by the heads 100 and 102. The head 100, for example, senses the clockwise channel pulses on the tape, and the head 102 senses the counterclockwise channel pulses on the tape. These pulses are amplified and shaped in the respective amplifiers 104 and 106. They are then fed to the lead 116 for clockwise rotation of the rotor 170 in the counter 150 under the control of the quadra-stable multi-vibrator network formed by the stages 108, 110, 112 and 114, or they are fed to the lead 118 for counterclockwise rotation of the rotor 170 under the control of the multi-vibrator stages. The multi-vibrator stages are arranged in pairs to form individual multi-vibrators, as will be described in detail. The multi-vibrator stages 108 and 112 form one multi-vibrator, and the multi-vibrator stages 110 and 114 form the other multi-vibrator. As noted above, only one multi-vibrator stage of each multi-vibrator may be energized at any one time.

As an initial condition, both of the multi-vibrator stages 108 and 110 may be energized. Under this condition, the gates 122, 124, 128 and 134 are opened because of the input connections to these gates from the multi-vibrator stages 108 and 110. A clockwise pulse on the lead 116 will not be translated by the gates 120 and 126. However, such a pulse will be translated by the gates 122 and 124. This pulse will, therefore, energize the multi-vibrator stage 112. Since the stages 108 and 112 are included in the same multi-vibrator, the clockwise pulse will automatically de-energize the multi-vibrator stage 108 at the same time that it is energizing the stage 112. The pulse passed by the gate 122 will have no effect on the multi-vibrator stage 110 because that stage is already energized.

Now instead of the multi-vibrator stages 108 and 110 being energized, the multi-vibrator stages 110 and 112 are now energized. For this latter condition, the gates 124, 126, 128 and 130 are opened. In like manner, therefore, the next clockwise pulse on the lead 116 will energize the multi-vibrator stage 114 and at the same time will automatically de-energize the multi-vibrator stage 110 since the stages 110 and 114 form a single multi-vibrator. This creates the condition in which the multi-vibrator stages 112 and 114 are energized.

The multi-vibrator circuit is so arranged, therefore, that successive clockwise pulses on the lead 116 cause the multi-vibrator stages to be successively energized in the order 108 and 110, 110 and 112, 112 and 114, 114 and 108, an so on. In like manner, counterclockwise pulses on the lead 118 cause the multi-vibrator stages to be successively energized in the order 114 and 112, 112 and 110, 110 and 108, 108 and 114, and so on. For example, a pulse may be sensed by the head 102 at the time that the multi-vibrator stages 114 and 112 are energized. This pulse will pass through the gate 130 because of the opening of this gate by the energized state of the multivibrator stage 112. The pulse passing through the gate 130 energizes the multivibrator stage 110. Since only one stage in the multivibrator formed by the stages 110 and 114 can be energized at any one time, the stage 114 becomes de-energized at the same time that the stage 110 becomes energized. As will be seen, the clockwise pulses on the lead 116 cause pairs of the multi-vibrator stages 108, 110, 112 and 114 to become energized in a first progressive sequence, and the counterclockwise pulses on the lead 118 cause pairs of the multi-vibrator stages to become energized in a second progressive sequence having a reverse relationship to the first sequence.

As each multi-vibrator stage becomes energized, its driver tube energizes a pair of associated coils 180, 182, 186, 188, 190, 192, in the counter 150. For example, when the multi-vibrator stages 108 and 110 are energized, a current flows through the coils 180 and 182 and the coils 186 and 188. This causes the rotor 170 to rotate to its illustrated position in Figure 2 so that its end 172 bridges the pole pieces 154 and 168, and so that its end 174 bridges the pole pieces 160 and 162. Because of polarity of the coils, the pole pieces 154 and 168 represent opposite poles at their extremities; likewise, the pole pieces 162 and 160 exhibit unlike poles at their extremities. Therefore, the ends of the rotor function to complete the magnetic circuits between these unlike poles and the rotor is attracted to the illustrated position.

A clockwise pulse on the lead 116 will cause the multi-vibrator stage 112 to become energized and the multi-vibrator stage 108 to become de-energized since the stages 108 and 112 are included in a single multivibrator. This in turn will energize the coil 190 and de-energize the coil 180. This pulse will also energize the coil 192 and de-energize the coil 182. This will cause the rotor 170 to turn in a clockwise direction so that the extremity 172 will bridge the pole pieces 154 and 156, and so that the extremity 174 will bridge the pole pieces 162 and 164. Subsequent clockwise pulses on the lead 116 will successively energize the multi-vibrator stages 108, 110, 112, 114 as described above and will cause the rotor 170 to continue its clockwise rotation. Each pulse from the head 100 will cause the rotor 170 to rotate through a particular angular distance dependent upon the relative configuration of the pole pieces in the rotor and in the core 152. Similarly, each pulse from the head 102 will produce a rotation in a counter clockwise direction through the particular angular distance. Therefore, the rotor 170 can be moved in a clockwise direction to any selected angular position as determined by the recorded digital pulses on the clockwise channel on the magnetic tape sensed by the head 100. In like manner, the rotor 170 of the counter can be moved in a counterclockwise direction to any angular position as determined by the number of pulses recorded in any particular group in the counterclockwise channel of the tape as sensed by the head 102.

The counter 150 and the associated multi-vibrator and amplifier stages, therefore, function to convert the recorded digital pulses on the magnetic tape into rotational positions. The counter 150 is, therefore, appropriate to control the rotational movements of a servomotor such as the servomotors described in Figure 1.

The actual mechanical power developed by the counter 150 is relatively small so that it is impractical to drive the load directly. Instead, the load is driven by a servomotor which is slaved to the angular position of the rotor 170 of the counter through a unique differential transformer arrangement which includes the transformers 202 and 204 and the core 200.

In a manner to be more fully described, the shaft of the rotor 170 is threaded into the tuning core 200 of the differential transformer arrangement 202 and 204. The servomotor feedback shaft which is coupled to the pinion 216 is also connected to the core 200 of the differentially-connected transformers 202 and 204. This latter shaft rotates in accordance with movements of the load, and it has a rotational drive pin which engages the core 200.

As noted above, the primary windings of the transformers 202 and 204 are differentially series wound, and these windings are energized by a suitable source 206 of alternating current. The voltage sum of the aiding series-connected secondary windings is introduced to the servomotor control circuit 208.

If the rotor 170 of the counter 150 is controlled to move in a clockwise rotational direction, its threads draw the tuning core 200 of the differential transformers to the left in Figure 2. This increases the coupling between the windings of the transformer 202 and decreases the coupling between the windings of the transformer 204. This results in a total output voltage from the secondary winding of the transformer of a magnitude and phase to cause the servomotor 38 to rotate the load and the feedback shaft through the gears 212, 214 and 216. The feedback shaft moves the transformer core 200 to the right in Figure 2 until the coupling between the windings of the transformers 202 and 204 are equal and opposite. This restores the null point from which the action started. To reverse the load movement, the tuning core 200 is moved in the opposite direction by the counterclockwise rotation of the rotor 170 under the control of counterclockwise pulses on the lead 118.

Detailed circuitry for the amplifiers 104 and 106 is shown in Figure 3. The circuitry for the amplifier 104 will be described in detail, it being understood that identical circuitry may be used for the amplifier 106.

As shown in Figure 3, one terminal of the electromagnetic pickup recording transducer head 100 is grounded, and the other terminal of this head is connected to the armature or pole of a switch 250. The switch 250 is a single-pole double-throw type, and its lower fixed contact is connected to a lead 252. This latter lead is connected to a pulse generator (not shown for purposes of simplification). When it is desired to record data on the magnetic tape, the switch 250 is actuated to its lower fixed contact. Then, the servo system such as the system shown in Figure 1 is controlled by the output pulses from the pulse generator under the manual manipulation of a potentiometer. Such control of the servo system causes the work table 10 of Figure 1 to follow a desired configuration corresponding to the operations that are to be performed on a supported workpiece. While this is taking place, the output pulses from the pulse generator may be recorded on the magnetic tape. This operation is described in the copending application referred to previously.

For the playback condition, the armature of the switch 250 is moved to its upper contact. This permits the recorded data on the tape to be used over and over to control the work table 10 in Figure 1 in accordance with the manner described briefly above.

The upper fixed contact of the switch 250 is connected to the control grid of a triode 254. A grounded resistor 256 is connected to the control grid and this resistor may have a resistance of 22 kilo-ohms. A resistor 258 of, for example, 4.7 kilo-ohms is connected between the cathode of the triode 254 and ground. A resistor 260 having a resistance of 470 kilo-ohms has one terminal connected to the anode of the triode 254, and the other terminal of this resistor is connected to the positive terminal of a source of direct voltage 262. This source may have a value of 250 volts, and it has a negative terminal and a grounded common terminal.

A capacitor 264 is connected between the anode of the triode 254 and the control grid of a triode 266. The triodes 254 and 266 may be included in a single envelope, in accordance with known practice. This envelope may be designated as a type 5751 and may be obtained from a number of different companies including the Radio Corporation of America. A grounded resistor 268 is connected to the control grid of the triode 266. The capacitor 264 may have a capacity of .001 microfarad, and the resistor 268 has a resistance of 2.2 megohms. An anode resistor 270 is connected between the anode of the triode 266 and the positive terminal of the source 262. The resistor 270 may have a resistance of 470 kilo-ohms. A grounded cathode resistor 272 of, for example, 4.7 kilo-ohms is connected to the cathode of the triode 266. The resistor 272 is shunted by a .1 microfarad capacitor 274.

A pair of series-connected capacitors 276 and 278 extend electrically between the anode of the triode 266 and ground. The common junction of these capacitors is connected to a lead 280. This lead is connected to the same generator as is the lead 252. The generator introducing pulses to the lead 280 is not shown for purposes of simplification. In this manner, during the recording operation, the manual control of the generator or generators through the appropriate potentiometer or potentiometers causes the output pulses to be recorded on the tape. The manual control of the generator or generators also causes the system to be controlled so that the work table 10 is manually driven over the desired path. As a result, the operator may be kept oriented during the initial manual adjustments.

The capacitor 276 may have a capacity of .001 microfarad, and the capacitor 278 may have a capacity of 100 micro-microfarads. The common junction of these capacitors is connected to one terminal of a resistor 282. This resistor may have a resistance of 100 kilo-ohms, and its other terminal is connected to the control grid of a triode 284. The triode 284 and a similar triode may be included within a single envelope such as a type 5751. A resistor 286 is connected between the control grid of the triode 284 and the positive terminal of the source 262, and a resistor 288 is connected between the anode of that triode and the positive terminal of the source. The resistor 286 may have a resistance of 10 megohms, and the resistor 288 may have a resistance of 100 kilo-ohms. A grounded resistor 290 of, for example, 1 kilo-ohm is connected to the cathode of the triode 284.

A resistor 292 and a series-connected capacitor 294 are connected between the anode of the triode 284 and the control grid of a triode 296. The resistor 292 may have a resistance of 47 kilo-ohms, and the capacitor 294 may have a capacity of 200 micromicrofarads.

A resistor 295 having suitable value such as 10 kilo-ohms is connected between the cathode of the triode 284 and the cathode of a triode 296. The triode 296 may be included with a similar triode in a single envelope, which may be designated as a type 5814 and which may be obtained from a number of different companies including the Radio Corporation of America. A 68 kiloohm resistor 298 is connected between the cathode of the triode 296 and the negative terminal of the source 262, this terminal having a suitable value such as in the order of −250 volts. Likewise, a resistor 300 is connected between the control grid of the triode 296 and this negative terminal. The resistor 300 may have a resistance of 1.5 megohms, and the resistor 298 has a resistance of 68 kilo-ohms.

A diode 302 has its anode connected to the control grid of the triode 296. The cathode of the diode 302 is connected to the anode of a diode 304. The cathode of the latter diode is, in turn, connected to the common junction of a pair of resistors 306 and 308, these latter resistors being connected as a voltage divider between the positive terminal of the source 262 and ground. The diodes 302 and 304 may be of the crystal type presently designated as IN89. The resistor 306 may have a resistance of 33 kilo-ohms. A diode 310 has its anode grounded, and the cathode of this diode is connected to the anode of a diode 312. The cathode of the latter diode is connected to the control grid of the triode 296. The diodes 310 and 312 may also be of the crystal type designated IN89. The triode 296 is connected as a cathode follower, and its anode is connected to the positive terminal of the source 262.

The cathode of the triode 296 is connected to one armature or pole of a double-pole double-throw reversing switch 314. The other armature or pole of this switch is connected to the cathode of a corresponding tube 297 in the amplifier 106. The purpose of this switch will be described. In its illustrated position, the switch 314 places the clockwise pulses from the amplifier 104 on the lead 116 ad the counterclockwise pulses from the amplifier 106 on the lead 118.

The junction of the resistors 306 and 308 is connected to one armature or pole of a second double-pole double-throw reversing switch 316. The switch 316 is mechanically coupled to the switch 314 for uni-control. The purpose of this latter switch 316 also will be described. The other armature or pole of the switch 316 is connected to the common junction of a pair of resistors in the amplifier 106 corresponding to the resistors 306 and 308. The fixed contacts of the switch 316 are respectively connected to a pair of leads 318 and 320.

During the recording process, and as described in the copending application, a bias current flowing through the heads 100 and 102 aligns the magnetic particles of the tape to form a north pole at one end of the tape and a south pole at the other end of the tape. Pulses recorded during this process on the tape appear as narrow magnetized areas displaced 180° with respect to the magnetic polarity resulting from the bias current. These narrow magnetized areas on the tape corresponding to the recorded pulses are as wide as the width of the recording head, and their length depends upon the length of the pulse and of the air gap on the head. In a constructed system, the magnetized areas are approximately .050 inch wide and approximately .002 inch long in the direction of movement of the tape.

When the tape with recorded data on it is passed, for example, past the head 100 of Figure 3, the magnetic flux through the head is maintained by the bias magnetism until a magnetized area corresponding to one of the recorded pulses is brought into operative relationship with the head. Then, the magnetic flux through the head is reversed as this magnetized area crosses the air gap in the head, and a voltage is generated across the head 100. This voltage is essentially a sine wave starting from zero and proceeding in the positive sense while the flux in the head is reversing, and the wave then passes through a negative cycle as the flux in the head returns to the bias condition. The voltage across the head 100 is shown in the curve A of Figure 8. The peak-to-peak value of this voltage may be of the order of 15 millivolts.

With the switch 250 in its illustrated position in Figure 3, the voltage pulse across the head 100 will be introduced to the amplifier of the triode 254, and the amplified pulse will be further amplified in the amplifier circuit of the triode 266. The resulting amplified voltage appearing at the anode of the triode 266 is shown in the curve B of Figure 8.

The triode 296 is connected as a cathode follower, as mentioned above, and the grid of this triode is held approximately at ground potential because forward conduction through the diodes 310 and 312 resists any tendency for this control grid to be drawn negative by the resistor 300. Since the anode of the cathode follower 296 is connected to the positive terminal of the source 262, conduction will occur through that tube and through the resistor 298. The resulting voltage drop across the resistor 298 will cause the cathode of the triode 296 to be established at a positive voltage of a value necessary to establish an equilibrium point in the circuit. This occurs, for example, when the cathode voltage of the triode 296 is of the order of +12 volts.

Because the control grid of the triode 284 is connected to the resistor 286, which in turn is connected to the positive terminal of the source 262, there is a tendency for the control grid of this triode to swing positive with respect to its cathode. This tendency causes the triode 284 to become fully conductive, with its cathode established at about the same potential as its control grid. Under these conditions, the cathode of the triode 284 may be established at about 3 volts positive, and the anode of this triode may be established at a positive voltage of the order of about 50 volts.

When the amplified pulse shown in the curve B of Figure 8 appears at the anode of the triode 266, this pulse is introduced through the coupling capacitor 276 and through the resistor 282 to the control grid of the triode 284. The positive-going cycle of this pulse attempts to drive the control grid of the triode 284 positive with respect to its cathode. This causes grid current to flow in the triode 284 to produce a voltage across the resistor 282 and to charge the capacitor 276. This action also produces a load on the triode 266 such that the positive portion of this pulse is amplified less than the negative portion. Since the triode 284 cannot appreciably increase its conduction in the presence of the pulse, by reason of the fact that it previously was in its fully conductive state, its plate potential will remain at the same value of about 50 volts, for example, during the positive going portion of the pulse cycle.

As the pulse at the anode of the triode 284 starts going negative, however, its fast rate of change exceeds the discharging rate of the capacitor 276 through the resistors 282 and 286, and the control grid of the triode 284 is driven negative. This drives the triode 284 to cutoff, and its plate voltage rises rapidly. This produces a positive-going pulse with an extremely fast positive-going wave front, as shown in the curve C of Figure 8. This latter pulse is coupled through the resistor 292 and through the capacitor 294 to the control grid of the cathode follower triode 296. The resulting rise in the grid voltage of the triode 296 causes its cathode to follow. Because of the polarity of the connections of the diodes 310 and 312, these diodes do not affect the positive swing of the control grid of the triode 296 by the pulse from the anode of the triode 284. However, the diodes 302 and 304 are connected to the junction of the resistors 306 and 308 with such a polarity that they become conductive after the amplitude of the signal introduced to the control grid of the triode 296 passes a threshold established by the bias on the latter diodes. These diodes function to hold the pulse voltage introduced to the cathode follower triode 296 at a selected positive value of, for example, 55 volts. This latter condition is maintained for an interval of, for example, 30 microseconds while the capacitor 294 is being charged by current flowing through the diodes 302 and 304 and through the resistor 300. When the capacitor 294 becomes charged, the voltage on the control grid of the triode 296 falls to zero, this voltage falling off at a rate corresponding to the rate of charge of the capacitor 294. This rate, of course, is determined by the values of the capacitor 294 and of the resistor 300. This latter voltage is shown by the curve D in Figure 8.

The triode 284 now returns to its original condition, with the capacitor 294 discharging from current through the diodes 310 and 312 as the anode of the triode 284 drops to its original voltage of, for example, 50 volts.

Weak output pulses from the cathode of the cathode follower triode 296 cannot arise because of a booster action through the resistors 290 and 295. Input signals at the control grid of the triode 284 which have sufficient amplitude to pass through the differentiating network formed by the resistor 292, the capacitor 294, the diodes 312 and 310, and the resistor 300 cause a portion of the positive-going voltage at the anode of the triode 284 to be fed back to its cathode through the resistors 290 and 295 to increase the grid-to-cathode potential difference of the triode 284. This assures that the output pulses will have a sufficient amplitude to be properly shaped by the network.

The effect of noise and other extraneous signals at the anode of the triode 266 is minimized by the diode action of the control grid of the triode 284. This latter action cancels out any positive-going signals including such noise signals. Moreover, sharp negative-going noise signals are shunted to ground by the capacitor 278. These latter signals must charge the capacitor to more than 2.5 volts negative, for example, to cause the divider action of the resistors 282 and 286 to introduce any of the noise to the control grid of the triode 284. On the other hand, relatively slow-changing noise signals, such as a 60-cycle hum, do not have the required fast rate of change to penetrate the differentiating network 276, 282 and 286, so that the latter type of noise is not introduced to the control grid of the triode 284. The circuit is relatively insensitive, therefore, to unwanted noise signals.

During the recording process, output pulses from the controlled generator are fed into the circuit at the junction of the capacitors 276 and 278 and the resistor 282. This causes the controlled servomotor to be actuated by means of the pulse generator itself, instead of from the recorded data on a magnetic tape. This permits the operator to be fully oriented while the recording process is in operation.

To allow index switches to reposition the load starting points and eliminate accumulated errors in the system, a connection is made at the junction of the resistors 306 and 308 and this connection is carried to one of the armatures or poles of the reversing switch 316. It will be appreciated that a similar connection is made to the amplifiers associated with the head 102 and that this latter connection is made to the other armature of the switch 316. When the load reaches its most clockwise position, a first index switch connected to one of the fixed contacts of the switch 316 grounds this fixed contact. This prevents any further pulses from appearing on the control grid of the triode 296 so that no further clockwise servo movement is possible. A similar connection may be made from the other fixed contact of the switch 316 to a counterclockwise index switch. This latter switch closes when the maximum counterclockwise position has been reached to have the same effect.

Output pulses from the cathode of the triode 296 are fed through the reversing switch 314 to the clockwise pulse lead 116. In like manner, the output pulses from the corresponding cathode follower in the amplifier 106 associated with the head 102 introduces counterclockwise pulses through the reversing switch 314 to the counterclockwise lead 118.

Throwing the switches 314 and 316 reverses all servo movements, and this is useful where image parts are to be made from the same tape recording. As noted, the index switch connections must also be reversed when the servo connections are reversed.

The circuitry of the quadra-stable aperiodic multi-vibrator control is shown in Figure 4. The quadra-stable multi-vibrator network in the system is made up of two bi-stable flip-flops working together to give four stable conditions. One flip-flop includes the triode 400 and 404, and the other flip-flop includes the triodes 402 and 406. The triodes 400 and 402 may be included within a first envelope, and the triodes 404 and 406 may be included within a second envelope. Each of the first and second envelopes may be a type 5814.

The anode of the triode 400 is connected to one terminal of a resistor 410, and the other terminal of this resistor is connected to the positive terminal of a source of direct voltage 412. The right hand terminal of the source 412 is, by way of example, 250 volts positive, with respect to ground, and the left hand terminal is 250 volts negative. The resistor 410 may have a value of 82 kilo-ohms.

A resistor 414 of, for example, 75 kilo-ohms is connected between the cathode of the triode 400 and the negative terminal of the source 412. A capacitor 416 is connected to the counterclockwise lead 118 and to the anode of a diode 418. The cathode of this diode is connected to the cathode of the triode 400. A diode 420 has its cathode connected to the cathode of the triode 400, and the anode of this diode is grounded. A diode 422 has its cathode connected to the cathode of the triode 400, and the anode of this latter diode is connected to a capacitor 424. The capacitor 424, in turn, is connected to the clockwise lead 116. The capacitor 416 may have a value of .003 microfarad, as may the capacitor 424. The diodes 418, 420 and 422 may all be of the semi-conductor crystals type such as are presently designated as IN89.

A further diode 426 has its anode connected to the control grid of the triode 400, and the cathode of this latter diode is grounded. The control grid of the triode 400 is connected to the common junction of a pair of resistors 428 and 430. The resistor 428 is connected to the anode of the triode 404 and the resistor 430 is connected to the negative terminal of the source 412. The resistor 428 may have a value of 750 kilo-ohms and the resistor 430 may have a value of 2.2 megohms.

A resistor 432 of, for example, 75 kilo-ohms is connected between the cathode of the triode 402 and the negative terminal of the source 412. Likewise, a resistor 434 of, for example, 82 kilo-ohms is connected between the anode of the triode 402 and the positive terminal of the source 412.

Diodes 436, 438 and 440 are grouped with their cathodes connected to the cathode of the triode 402. A capacitor 442 electrically couples the anode of the diode 436 to the lead 118. In like manner, a capacitor 444 electrically couples the anode of the diode 438 to the lead 116. The anode of the diode 440 is grounded. Each of the diodes may be of the type presently designated as IN89, and each of the capacitors 442 and 444 may have a capacity of .003 microfarad.

The control grid of the triode 402 is connected to the common junction of a pair of resistors 446 and 448. The resistor 446 may have a resistance of 750 kilo-ohms, and the resistor 448 may have a resistance of 2.2 megohms. A diode 450 has its anode connected to the control grid of the triode 402, and the cathode of this diode is grounded. This diode, like the previous ones, may be of the type designated as IN89. The other terminal of the resistor 446 is connected to the anode of the triode 406. The other terminal of the resistor 448 is connected to the negative terminal of the source 412. A resistor 451 of, for example, 82 kilo-ohms is connected between the anode of the triode 404 and the positive terminal of the source 412. The cathode of the triode 404 is connected to one terminal of a 75 kilo-ohm resistor 452, the other terminal of this latter resistor being connected to the negative terminal of the source 412.

A capacitor 454 is connected to the lead 118, and a capacitor 456 is connected to the lead 116. Each of these capacitors may have a capacity of .003 microfarad. The capacitors 454 and 456 are respectively connected to the anodes of a pair of diodes 458 and 460. The cathodes of these diodes are connected to the cathode of the triode 404. A further diode 462 has its cathode connected to the cathode of the triode 404, and the anode of this latter diode is grounded. Each of the diodes 458, 460 and 462 may be of the type designated in IN89.

A diode 464 has its anode connected to the control grid of the diode 404, and the cathode of this latter diode is grounded. The diode 464 may be of the type designated as IN89.

The control grid of the triode 404 is also connected to the common junction of a pair of resistors 466 and 468, these resistors being respectively connected to the anode of the triode 400 and to the negative terminal of the source 412. The resistor 466 may have a value of 750 kilo-ohms, and the resistor 468 may have a value of 2.2 megohms.

The lead 118 is also connected to a capacitor 470 having a capacity of, for example, .003 microfarad. This capacitor, in turn, is connected to the anode of a diode 472, and the cathode of this diode is connected to the cathode of the triode 406. A resistor 474 of, for example, 75 kilo-ohms is also connected to the cathode of the triode 406 and to the negative terminal of the source 412. A diode 476 has its cathode connected to the cathode of the triode 406, and the anode of this latter diode is grounded. The lead 116 is also connected to a capacitor 478, this latter capacitor having a capacity of .003 microfarad. The capacitor 478 is connected to the anode of a diode 480, the cathode of this diode being connected to the cathode of the triode 406. A diode 482 has its anode connected to the control grid of the triode 406, and the cathode of this latter diode is grounded. The diodes 472, 476, 480 and 482 may all be of the crystal type as presently designated IN89.

The anode of the triode 406 is connected to one terminal of a resistor 484, the other terminal of this resistor being connected to the positive terminal of the source 412. This resistor may have a resistance of 82 kilo-ohms. A pair of resistors 486 and 488 are connected in series between the anode of the triode 402 and the negative terminal of the source 412, and the control grid of the triode 406 is connected to the common junction of these resistors. The resistor 486 may have a value of 750 kilo-ohms, and the resistor 488 may have a value of 2.2 megohms.

The anode of the triode 400 is connected to Figure 5 by a lead 490 to a resistor 492 which, in turn, is connected to the control grid of a driver amplifier triode 494. Likewise, the anode of the triode 402 is connected by a lead 496 to a resistor 498 in Figure 5, the resistor 498 being connected to the control grid of a driver amplifier triode 500. The triode 500 may be included with the triode 494 in an envelope which may be designated as a Type 6080 and which may be obtained from a number of different companies including the Radio Corporation of America.

The anode of the triode 404 is connected by a lead 502 to a resistor 504 in Figure 5, this latter resistor being connected to the control grid of a driver amplifier triode 506. Finally the anode of the triode 406 is connected by way of a lead 508 to a resistor 510 in Figure 5, this latter resistor being connected to the control grid of a triode 512 which, also, is connected as a driver amplifier. The triode 512 may be included with the triode 506 in an envelope which may be designated as a Type 6080. Each of the resistors 492, 498, 504 and 510 may have a value of 2.7 megohms.

The anode of the triode 494 in Figure 5 is connected to a resistor 514 which, in turn, is connected to a resistor 516. The latter resistor is connected to the positive terminal of the source of direct voltage 184 which, for example, may have a value of 140 volts. The negative terminal of the source 184 is grounded. The resistor 514 may have a resistance of 300 ohms, and the resistor 516 may have a resistance of 1 kilo-ohm.

A pair of series-connected resistors 520 and 522 are connected between the control grid of the triode 494 and the negative terminal of a source of direct voltage 524. This latter source may, for example, have a value of 550 volts, and the positive terminal of this source is grounded. The resistor 520 may have a resistance of 3.9 megohms, and the resistor 522 may have a resistance of 5.1 megohms.

A resistor 526 of, for example, 150 ohms is connected between the cathode of the triode 494 and ground. A first pair of resistors 528 and 530 are connected between that cathode and the negative terminal of a source of direct voltage 532. The positive terminal of the latter source is grounded, and that source may have a value of 250 volts. A second pair of resistors 534 and 536 are also connected in series between the cathode of the triode 494 and the negative terminal of the source 532. The resistors 528 and 534 may have a resistance of 39 kilo-ohms, and the resistors 530 and 536 may have a resistance of 330 kilo-ohms. The common junction of the resistors 528 and 530 is connected by way of a lead 538 back to the junction of the capacitor 470 and the diode 472 in Figure 4. Likewise, the common junction of the resistors 534 and 536 is connected by way of a lead 540 to the common junction of the diode 438 and the capacitor 444 in Figure 4.

A pair of series-connected resistors 542 and 544 are connected between the control grid of the triode 500 and the negative terminal of the source 524. The resistor 542 may have a value of 3.9 megohms, and the resistor 544 may have a value of 5.1 megohms. The cathode of the triode 500 is connected to a grounded resistor 546 of, for example, 150 ohms. The anode of the triode 500 is connected to a 300-ohm resistor 548 which, in turn, is connected to a 1 kilo-ohm resistor 550. The latter resistor is connected to the positive terminal of the source 184.

A first pair of series-connected resistors 552 and 554 are connected between the cathode of the triode 500 and the negative terminal of the source 532. Likewise, a second pair of resistors 556 and 558 are connected in shunt with the resistors 552 and 554. The resistors 552 and 556 may have a resistance of 39 kilo-ohms, whereas the resistors 554 and 558 may have a resistance of 330 kilo-ohms.

The common junction of the resistors 552 and 554 is connected to a lead 560. This latter lead is connected back to the junction of the capacitor 416 and the diode 418 in Figure 4. Likewise, the common junction of the resistors 556 and 558 is connected to a lead 562, the latter lead being connected back to the junction of the diode 460 and the capacitor 456 in Figure 4.

A pair of resistors 564 and 566 are connected in series between the control grid of the triode 506 and the negative terminal of the source 524. The resistor 564 may have a resistance of 3.9 megohms, and the resistor 566 may have a resistance of 5.1 megohms.

A pair of series-connected resistors 568 and 570 are connected between the anode of the triode 506 and the positive terminal of the source 184. The resistor 568 may have a value of 300 ohms, and the resistor 570 has a resistance of 1 kilo-ohm.

The cathode of the triode 506 is connected to a grounded resistor 572 of 150 ohms. The cathode is further connected to a pair of resistors 574 and 576, each having a resistance of 39 kilo-ohms. A further pair of resistors 578 and 580 are respectively connected between the resistors 574 and 576 and the negative terminal of the source 532. Each of the resistors 578 and 580 may have a resistance of 330 kilo-ohms.

The common junction of the resistors 574 and 578 is connected to a lead 582. In like manner, the common junction of the resistors 576 and 580 is connected to a lead 584. The lead 582 extends back to the junction of the capacitor 442 and the diode 436 in Figure 4. The lead 584, on the other hand, extends back to the junction of the diode 480 and the capacitor 478 in Figure 4.

A pair of resistors 588 and 590 are connected in series between the control grid of the triode 512 and the negative terminal of the source 524. The resistor 588 has a value of 3.9 megohms, and the resistor 590 has a value of 5.1 megohms. A grounded resistor 592 of, for example, 150 ohms is connected to the cathode of the triode 512, and a 300-ohm resistor 594 is connected to its anode. A resistor 596 is connected between the positive terminal of the source 184 and the other terminal of the resistor 594. The resistor 596 may have a resistance of 1 kilo-ohm. A pair of resistors 598 and 600, each having a resistance of 39 kilo-ohms, are connected to the cathode of the triode 512. A resistor 602 connects the resistor 598 to the negative terminal of the source 532, and a resistor 604 connects the resistor 600 to that terminal. Each of the resistors 602 and 604 may have a resistance of 330 kilo-ohms.

The common junction of the resistors 598 and 602 is connected to a lead 606. This lead extends back to the junction of the capacitor 454 and the diode 458 in the circuit of Figure 4. Likewise, the common junction of the resistors 600 and 604 is connected to a lead 608, and this latter lead extends back to the junction of the diode 422 and the capacitor 424 in the multi-vibrator circuit of Figure 4.

As described in conjunction with the system of Figure 2, each of the coils 182, 188, 192 and 196 of the counter 150 has one terminal connected to the positive terminal of the source 184. The other terminal of the coil 182 is connected to the coil 180 which, in turn, is connected to the common junction of the resistors 514 and 516. Likewise, the coil 188 is connected to the coil 186 which is connected to the common junction of the resistors 548 and 550. The coil 192 is connected in series with the coil 190, and the remote terminal of the latter coil is connected to the common junction of the resistors 568 and 570. Finally, the coil 196 is connected to one terminal of the coil 194, and the other terminal of this coil is connected to the junction of the resistors 594 and 596.

The cathodes of the multi-vibrator triodes 400, 402, 404 and 406 are prevented from going negative by the forward conduction through their respective diodes. Current through the respective cathode resistors 414, 432, 452 and 474 is sufficient to hold these cathodes at ground potential during the quiescent periods of their corresponding triodes and to allow the cathodes at the same time to have a high impedance characteristic with respect to the controlling pulses. The control grids of the triodes 400, 402, 404 and 406 are prevented from going positive with respect to ground by their associated diodes 426, 450, 464 and 482.

When the triode 400 is in its conductive state, the current through its anode resistor 410 is such that the anode voltage of this triode drops to a value of, for example, 40 volts positive. This anode voltage is applied to the upper end of the voltage divider formed by the resistors 466 and 468 and by the back resistance of the diode 464. This causes the voltage at the control grid of the triode 404 to assume a negative value of the order of —25 volts. This negative value is sufficient to render the triode 404 non-conductive. When the triode 404 is non-conductive, its anode voltage will have a relatively high positive value of, for example, 230 volts. This latter voltage is applied to the divider formed by the resistors 428 and 430 and by the forward resistance of the diode 426, the latter being in effect because the relatively high voltage from the anode of the triode 404 drives the common junction of the resistors 428 and 430 positive with respect to ground, so that the anode of the diode 426 is driven in a positive direction. The control grid of the triode 400 is, therefore, held at ground potential to maintain full conduction in that triode.

If the cathode of the triode 400 is momentarily driven positive to a voltage, for example, of the order of 20 volts, the conduction through the triode 400 is momentarily interrupted. This returns the control grid of the triode 404 to ground potential to render the latter triode conductive, thus causing the control grid of the triode 400 to swing negative with respect to ground. The triode 400 is, therefore, held non-conductive when its cathode is allowed to return to ground potential. Therefore, driving the cathode of the triode 400 momentarily positive causes a triggering action to occur so that the triode 400 assumes a non-conductive state and the triode 404 assumes a conductive state. Driving the cathode of the triode 404 momentarily positive returns the triode 400 to its original conductive state and the triode 404 to its non-conductive state.

The triodes 402 and 406 work together in the same manner. That is, a momentary pulse on the cathode of the triode 402 causes it to assume a non-conductive state and the triode 406 to assume a conductive state. Alternately, the momentary introduction of a positive pulse on the cathode of the triode 406 causes it to assume a non-conductive state and causes the triode 402 to assume a conductive state.

Each of the four multi-vibrator triodes 400, 402, 404 and 406 controls a corresponding one of the driver triodes 494, 500, 506 and 512 in Figure 5. When the multi-vibrator triode 400, for example, is in its conductive state, its plate voltage is reduced to a positive value of about 40 volts, for example. Therefore, the voltage appearing on the control grid of the driver triode 494 is the voltage appearing at the common junction of the resistors 492 and 520, which resistors with the resistor 522 make up a voltage divider. With 40 volts appearing at the anode of the conductive multi-vibrator triode 400, this voltage at the junction of the resistors 492 and 520 has a substantial negative value of the order of 100 volts. This is sufficient to maintain the driver triode 494 non-conductive. However, when the multi-vibrator triode 400 is triggered to a non-conductive state, its plate voltage rises to a relatively high value of the order of 230 volts positive. The voltage on the control grid of the driver triode 494 tries to rise to a positive voltage of about 60 volts. However, it is held at cathode potential of about 30 volts by the grid current flow in the triode 494. The driver triode 494, therefore, becomes conductive when the multi-vibrator triode 400 is triggered to its non-conductive state. The conduction through the driver triode 494 begins immediately, but the resulting plate current flow is limited by the inductive reactance of the coils 180 and 182 which are included in the anode circuit of this triode. These two coils, as described above, are included in the counter 150 of Figure 2. The inductive reactance of these coils causes the initial current through the triode 494 to be drawn to a large extent through the resistor 516. However, as time passes, the reactance of the coils 180 and 182 becomes progressively less effective in impeding current flow and more and more current flows through the coils. After a time of, for example, about 200 microseconds, the quiescent state is reached and the plate current through the driver triode 494 reaches a value of the order of .2 ampere. By this time, the voltage drop across the cathode resistor places the cathode of the triode 494 at a positive voltage of the order of 30 volts. Grid current in the triode holds the control grid at approximately the same potential.

When the quadra-stable multi-vibrator is triggered to a different operating condition and the triode 400 is again rendered conductive, the control grid of the triode 494 returns to about 100 volts negative and attempts to cut off that triode. However, the inductive surge of the coils 180 and 182 places a large positive voltage on the anode of the triode 494 so that the negative grid potential does not immediately drive the triode non-conductive. After a few microseconds, the inductive voltage across these coils drops off and the triode 494 becomes non-conductive. Therefore, whenever the multi-vibrator action is such that the triode 400 is triggered to a non-conductive state, the driver tube 494 is rendered conductive and a current flow gradually builds up through the coils 180 and 182. On the other hand, when the multi-vibrator triode 400 is rendered conductive, the resulting action of the driver triode 494 causes the current flow through these coils gradually to be reduced to zero. The operation of the other driver triodes 500, 506 and 512 is exactly the same. Whenever the triode 402 is rendered conductive, the driver triode 500 is rendered non-conductive, and vice versa. Likewise, the triode 404 controls the driver triode 506, and the triode 406 controls the driver triode 512.

In the explanation of the triggering action of the multi-vibrator, the operational sequence for clockwise rotation of the counter 150 will be discussed. It will become evident that similar operations occur for the counterclockwise rotation of the counter.

Assume first that the triodes 400 and 402 are in their non-conductive states. Therefore, their opposite flip-flop sections 404 and 406 are fully conductive. This means that the coils 180, 182, 186 and 188 in the counter 150 are energized. The cathodes of the driver triodes 494 and 500 are at a positive voltage of the order of 30 volts, and the common junction of the voltage divider resistors 528, 530 and of the voltage divider resistors 534 and 536 connected to the cathode of the triode 494 are established at ground potential. Likewise, the common junction of the resistors 552 and 554 and the common junction of the resistors 556 and 558 connected to the cathode of the triode 500 are also established approximately at ground potential.

The voltage dividers referred to immediately above control the clockwise gates of the multi-vibrator. The lead 540 from the common junction of the resistors 536 and 534 places ground potential at the junction of the diode 438 and the capacitor 444. This causes the capacitor to assume a charge with its left side being established at approximately ground potential and with its right side being established at the potential of the clockwise rotation lead 116. Since the cathode of the non-conductive triode 402 is also at ground potential, there is no voltage across the diode 438. In like manner, the lead 562 from the voltage divider resistors 556 and 558 places a ground potential at the junction of the diode 460 and the capacitor 456. The cathodes of the triode 404 and of the diode 460 are also at ground potential during current flow through the triode because of the action of the diode 462. Since both the cathode and anode of the diode 460 are at ground potential, no current is able to flow through the diode. The capacitor 456, like the capacitor 444, assumes a charge in which its left hand terminal is established essentially at ground potential and its right hand terminal is at the potential of the clockwise lead 116.

Because the multi-vibrator triodes 404 and 406 are fully conductive, their corresponding driver triodes 506 and 512 are non-conductive for the reasons described above. The cathodes of these latter triodes are, therefore, established at a voltage near ground potential. Therefore, the voltage at the common junction of the resistors 576 and 580 is at a negative potential, as is the voltage at the common junction of the resistors 600 and 604. This negative voltage in each instance may be of the order of 26 volts. The lead 584 from the voltage divider resistors 576 and 580 establishes the common junction of the diode 480 and the capacitor 478 at this negative voltage. This causes the capacitor 478 to be charged such that its left terminal is established at a negative voltage of 26 volts, and its right terminal is established at the voltage of the clockwise lead 116. Because the cathode of the conductive triode 406 is at ground potential, the diode 480 has a negative voltage applied between its anode and cathode so that this diode is in its non-conductive state.

In like manner, the lead 608 connects the junction of the voltage divider resistors 600 and 604 to the common junction of the diode 422 and the capacitor 424. This causes the capacitor 424 to assume a charge corresponding to the voltage difference between the lead 608 and the clockwise control lead 116. Also, the diode 422 has a back voltage applied across it of the order of 26 volts.

The connections described above establish a stable condition between the quadra-stable multi-vibrator and the driver triodes which can last indefinitely.

When a triggering pulse appears on the clockwise lead 116, it passes through the capacitor 424 and drives the lead 608 positive from its initial negative 26-volt value. The pulse must have an amplitude greater than the voltage on the lead 608 so that it can drive the diode 422 to its conductive state. This causes the cathode of the triode 400 to go slightly positive but has little effect on the conduction of this triode.

In like manner, the clockwise triggering pulse on the lead 116 passes through the capacitor 478 and overcomes the back voltage across the diode 480 to drive the cathode of the triode 406 slightly positive, however this has little effect on the conductivity of that triode. The pulse also passes through the capacitor 444 and finds no appreciable back voltage across the diode 438 because the lead 540 is, as noted above, essentially at ground potential. Therefore, the triggering pulse immediately drives the cathode of the triode 402 positive to a voltage sufficient to render it non-conductive if it had been conducting. However, the triode 402 is already non-conductive so that this voltage has no effect on the multi-vibrator circuit.

However, the triggering pulse also passes through the capacitor 456 and, because the lead 562 is at ground potential, it drives the cathode of this triode to an appreciably positive value. The triode 404 was fully conductive, but it is now held at cut-off for the duration of the triggering pulse. Thus, the control grid of the triode 400 is driven to ground potential causing that triode to become conductive and to drive the control grid of the triode 404 negative with respect to ground. When the clockwise triggering pulse passes, the triode 404 still cannot conduct because its control grid is now held negative.

Therefore, a triggering action occurs in which the triode 400 now becomes conductive and the triode 404 becomes non-conductive. Also, the coils 180 and 182 become de-energized and the coils 190 and 192 become energized, the coils 154 and 162 remaining energized. The rotor 170 of the counter 150 of Figure 2, therefore, takes one step clockwise and the cathode voltage dividers of the driver triodes charge the gating capacitors so that the next clockwise pulse will cut off the triode 406 and render the triode 402 conductive, thereby causing the next clockwise step. Rotation of the rotor 170 of the counter 150 of Figure 2 will continue as long as clockwise pulses appear on the clockwise lead 116.

During the clockwise rotation of the counter described above, the counterclockwise gates formed by the diodes 418, 436, 458 and 472 are also opened and closed, but they take no part in the operation because the voltage of the counterclockwise lead 118 remains constant. The cathode voltages of the triodes 400, 402, 404 and 406 which are driven positive by the clockwise pulses on the lead 116. These cathode voltages cause only the back voltages across the counterclockwise gate diodes to increase. Operation of the circuit for counterclockwise rotation results only from pulses appearing on the counterclockwise pulse lead 118, and this latter operation is identical to the clockwise operation described above.

The circuit thus far described is therefore capable of receiving recorded pulses from the magnetic tape and of converting these pulses to rotational motion of the counter 150. The described counter and associated circuitry are capable of responding to pulses which recur at the rate of about 6000 per second. This limit is reached when the time between successive pulses is less than the required charge time (about 120 microseconds) of the gating capacitors. The pulse rate limit is further dependent upon the reactance of the coils 180, 182, 186, 188, 190, 192, 194 and 196 of the counter as described above.

The mechanical details of the counter 150 and the coupler of Figure 2 are shown in Figures 6 and 7.

In the illustrated embodiment, the counter 150 has an 8-pole stator which includes the pole pieces 154, 156, 158, 160, 162, 164, 166 and 168. These pole pieces are composed of magnetic material such as steel. The rotor 170 in the embodiment of Figures 6 and 7 is also composed of a magnetic material, such as steel, and it is shown as including ten poles. The rotor poles extend radially outward from the central portion of the rotor and they are equi-distantly spaced from one another about this central portion.

The rotor 170 is keyed to a non-magnetic shaft 700 composed, for example, of brass. A first ball bearing assembly 702 and a second ball bearing assembly 704 are supported at spaced positions on the shaft 700. These bearings are held in spaced positions on the shaft by an annular spacer 706 which is mounted on the shaft. A spring 708 is interposed between the end of the spacer 706 and the bearing assembly 704 to provide the required pre-loading for the bearing. The shaft 700 has a collar 710 formed at one end to hold the bearing assemblies against longitudinal movement on the shaft, and a nut 712 is threaded onto a threaded portion 714 of the shaft against the bearing 704 to hold the bearings assembled on the shaft 700 and against the collar 710. The nut 712 also serves to limit the rotation of the tuning core 200 of the differential transformers 202 and 204, as will be described.

The left end of the shaft 700 has a threaded portion 716, and the rotor 170 is keyed to this threaded portion. A nut 718 is threaded onto the portion 716 of the shaft to hold the rotor 170 rigidly against the collar 710.

The pole pieces 154, 156, 158, 160, 162, 164, 166 and 168, and their common connecting yoke 152 form the stator of the counter assembly, and this stator is rigidly supported by a stationary base member. An annular-shaped holder 720 is mounted coaxially with the bearing assembly 702 and 704, and this member serves as a holder for the bearing assemblies. The holder 720 is secured to the stator base 150 by studs such as the stud 722 and, like the stator portion of the counter, the holder 720 is held in a stationary position.

A base member 724 for the differential transformers 202 and 204 supports the stator base and the bearing holder 720 as by the stud 722. The base 724 is, therefore, also held in a stationary position. The respective cores of the transformers 202 and 204 are fastened to the holder member 720 and to the base member 724, as shown. These cores are arranged, as illustrated, to present a central air gap which is completed by the reciprocally movable core 200. As the core 200 is moved to the left in Figure 7, the reluctance of the magnetic circuit of the transformer 202 decreases and the reluctance of the magnetic circuit of the transformer 204 increases. Similarly, when the core 200 is moved to the right in Figure 7, the reverse occurs.

The core 200 is mounted on an elongated circular insulating holder 726 composed, for example, of nylon. This holder is threaded onto the threaded portion 714 of the shaft 700. Therefore, as the shaft 700 is rotated, and because rotation of the insulator 726 is prevented in a manner to be described, the core 200 is caused to move in a reciprocal manner with respect to the cores of the transformers 202 and 204 to vary the reluctance of the magnetic circuits, as described above.

The cores of the transformers 202 and 204 may comprise, for example, a tubular member 728 which is composed of magnetic material such as steel. A first washer 730 is positioned at one end of the tube 728 and a second washer 732 is positioned at the other end of the tube. The tube 728 and the washers 730 and 732 are supported by the members 720 and 724 to be coaxial with the core 200 as it is mounted on the insulating holder 726. The windings of the transformers 202 and 204 are supported within the tube 728, and a further washer 734 separates the transformer windings. The windings of the transformer 202 may be wound, for example, on an insulating coil form 736, and the windings for the transformer 204 may be wound on an insulating coil form 738. The washers 730, 732 and 734 may also be composed of a magnetic material such as steel, and the coil forms 736 and 738 may be composed of an insulating material, such as nylon.

Tightening of the studs 722 causes the base member 724 to force the washer 730 against the end of the tube 728, and to force the tube 728 against the washer 732. This holds the cores of the transformers 202 and 204 in a rigidly assembled condition. A tolerance compensating annular gasket 740 may be interposed between the washer 730 and an annular flange of the member 724 so that a resilient tight fit can be provided for the core assembly.

The shaft 700 has a further portion 742 extending to the right in Figure 7 from the end of its threaded portion 714. The shaft portion 742 is rotatably mounted in a pilot bearing 745 on a feed-back shaft 744, and the shaft 744 is mechanically coupled to the gear 216. The shaft 744 includes an eccentric drive pin 746 which extends parallel to the portion 742 of the shaft 700 and which engages the friction drive plate 748 of an over-limit clutch. The plate 748 is biased against the flanged end 750 of the tubular holder 726 by means of a spring 752 composed, for example, of bronze. When the feed-back shaft 744 is rotated by the gear 216, the pin 746 rotates about the axis of the shaft 700 to rotate the insulating holder 726 on the threaded portion 714 of the shaft 700. This rotation of the insulating member 726 causes it to move the core 200 in a reciprocal manner with respect to the cores of the transformers 202 and 204. Therefore, rotation of the shaft 700, causing the core 200 to move to the right in Figure 7, is met by an opposing feed-back rotation of the shaft 744 which tends to return the core to its original null position. This feed-back operation occurs constantly to maintain the core 200 at all times in a null position with respect to the windings on the differential transformer. In this way, any deviations of the core 200 from the null position represent an error which must be instantly corrected.

As stated previously, the nut 712 also serves as a limiter for the axial movement of the core 200. When the insulating holder 726 moves to the left in Figure 7 to a limiting position, it engages the nut 712. This limits the movement of the holder 726 so that any further drive exerted merely causes the counter 150 or the clutch 748, 750 to slip. Another stop member 760 is secured to the portion 742 at the other end of the shaft 700. The stop member 760, in like manner, limits movement of the core 200 to the right in Figure 7.

It should be appreciated that the movements of the holder 726 and the core 200 never reach the limits represented by the nut 712 and the stop member 760 during the normal operation of the apparatus constituting this invention. The limits are reached only during such unusual situations as the malfunctioning of the equipment or the imposition of an excessive load on the servomotor. Actually, in normal operation, the holder 726 and the core 200 have only a small displacement from a null position since the error represented by such displacements from the null position is constantly being corrected.

The shaft 700 also has a portion 762 extending to the left in Figure 7 from the portion 716. A torsional damper fly-wheel 764 is freely rotatable on the portion 762, and this fly-wheel is enclosed in a case 766 which is fastened to the shaft. A nut 760, threaded to the end of the shaft portion 762, holds the case and flywheel in an assembled condition. The hydraulic torsional damper formed by the flywheel 764 and its case 766 is of known construction and operates in accordance with known principles. This damper is required during rotation at some speeds as will be described.

The arrangement is such that the counter 150 is required to overcome only the load due to the friction of the bearings 702 and 704 and the friction between the threads of the shaft portion 714 and the insulatng holder 726.

When the coils 180, 186, 182 and 188 are energized, a magnetic path is formed through the pole piece 154 of the stator to the top of the pole piece 168 and through the pole piece 168 to the pole 1 of the rotor 170, across to the pole 2 of the rotor and back to the pole piece 154 of the stator. The magnetism causes the rotor to rotate so that the space between the poles 1 and 2 is exactly centered between the stator poles 154 and 168. Also, the flux generated in the stator coils 182 and 188 helps to rotate the rotor 170 by causing it to center the space between its poles 6 and 7 between the stator pole pieces 160 and 162.

A clockwise pulse introduced to the system de-energizes the coils 180 and 182. However, this pulse does not affect the energized condition of the coils 186 and 188, and it energizes the coils 190 and 192. The flux now circulates around the stator poles 156 and 154 and through the rotor poles 3 and 2 causing the rotor to rotate 9° clockwise to center the space between the rotor poles 3 and 2 between the stator pole pieces 156 and 154. The coils 188 and 192 assist this latter action by creating a flux between the stator pole pieces 162 and 164 to cause the rotor to turn so that the space between its poles 7 and 8 is accurately centered between these latter stator pole pieces.

Of course, a counterclockwise rotation of 27° would align the rotor poles 3 and 4 with the stator pole pieces 156 and 154 to produce a stable point in response to the clockwise pulse. However, such counterclockwise rotation is three times greater than the 9° clockwise rotation needed for aligning the rotor poles 3 and 2 with the stator pole pieces 156 and 154. It is evident, therefore, that the clockwise torque will predominate. The rotor will turn in a clockwise direction, therefore, in response to the clockwise pulse.

A second clockwise pulse will de-energize the coils 186 and 188. This second pulse will not affect the energized condition of the coils 190 and 192, and it will energize the coils 194 and 196. This latter pulse will cause the rotor 170 to rotate in the clockwise direction through a second 9-degree increment. The third and fourth clockwise pulses will move the rotor through two more increments in the clockwise direction and return the control circuits to their starting point with the coils 180 and 186 energized. The rotor has now turned through one rotor pole space (36 degrees) so that the space between the rotor poles 10 and 1 is aligned with the space between the stator pole pieces 168 and 154. Forty pulses are required, therefore, to rotate the rotor through one complete revolution. Counterclockwise pulses reverse the direction of the energy of the stator windings to produce a reverse rotor rotation.

Because the pulses from the magnetic tape may be somewhat unevenly spaced due to the limitations in the handling of the tape by the recorder, the maximum speed of the equipment may be somewhat limited. However, speeds in the order of 6000 pulses per second have already been attained and it is anticipated that speeds considerably in excess of this value can be attained with slight modification of the equipment. This corresponds to a speed in the counter 150 of the order of 9000 r.p.m.

To prevent drop-outs on fast starts and stops, which could be caused by the inertia of the rotor 170 of the counter 150, the pulse generating system used for making the recordings has an electronic inertia system which limits the pulse rate change to a maximum that the counter can comfortably follow. This electronic system is fully described in the copending application referred to previously. Once a drop-out occurs, the rotor 170 of the counter 150 will not get back into step until the pulse rate slows down to a few hundred per second. The copending application referred to above describes the manner in which the pulse rate is limited so that changes do not occur quicker than the inertia of the counter can follow.

During very slow counting, the small low inertia rotor 170 of the counter 150 moves quickly in response to each pulse and then comes to rest and waits for the next pulse. At high speeds, however, the inertia carries the rotor along smoothly with the first part of each pulse producing an acceleration for the rotor, and the last part producing a deceleration to hold the rotor in step. However, during this increased rate, the rotor moves continuously and it is never completely stopped. At some particular intermediate speed, the rotor would drop out of step were it not for the hydraulic torsional damper composed of the elements 764 and 766. The ball-bearing mounted rotor 170, with only the insulating member 726 and the pilot bearing 745 to impede its free rotation, would be relatively frictionless when there is little air drag, and oscillations could occur causing drop-out of the rotor.

The illustrated damper includes a cylindrical, tightly sealed casing 766 which may be composed of aluminum and which is attached to the rotor shaft. The weight of this casing is held at a minimum to reduce the amount of inertia. The casing contains a freely rotating flywheel which is machined for accurate clearances between its peripheral surface and the outer surface of the casing 766. The casing is filled with a suitable oil, such as a silicone oil.

At high speeds, the casing 766 and the flywheel 764 turn smoothly together and add inertia to the system, but these elements do not increase the drag on the counter 150 except for minute wind friction. However, at lower speeds where the rotor rotation is not smooth, oscillations are damped by energy absorption through the friction of the oil in the casing as the flywheel moves with respect to its casing.

With the inclusion of the damper arrangement described above, when a pulse is introduced, it causes the coil 180 to become de-energized, the coil 186 to remain energized and the coil 190 to become energized. The rotor now accelerates toward the desired angular position represented by the additional pulse and carries the damper casing 766 with it. The inertia of the damper flywheel 764 resists the acceleration and its angular change is less than that of the rotor itself. When the rotor passes the desired angular position the total inertial energy of the rotor system is lessened by the amount absorbed by fluid friction in the oil, and the rotor has enough energy only to move a relatively short distance past the desired position. As the rotor accelerates back toward the desired position further slip in the viscous silicone oil in the casing 766 absorbs additional energy so that the rotor overshoots to a position only about one-quarter of the distance travelled by it during its first acceleration. In this way, damping occurs relatively quickly even when pulses are introduced in quick succession to turn the rotor.

As mentioned briefly above, the counter 150 controls the servomotor 38 through a movable core-tuned differential transformer arrangement. As described, there are two transformer coil forms 736 and 738, each with a primary winding of about 80 turns wound near its axis and a secondary winding of about 500 turns wound over the corresponding primary winding. The two coil forms are covered by the steel sleeve or tube 728 as described, and there is a steel washer 734 between the coil forms and a pair of steel washers 730 and 732 at the opposite ends of the assembly.

The transformer primary windings are connected in differential series and the two secondary windings are connected in aiding series as noted above. When the primary windings of the transformers are energized with an alternating current of the order of 2000 cycles, and the core 200 is exactly centered, the magnetic flux around each of the coil forms 736 and 738 is equal, and the voltages induced in the secondary windings have equal amplitude but of opposite phase. These voltages, therefore, will cancel across the secondary windings so that the total output voltage from the transformer is zero.

When the rotor 170 of the counter 150 turns the portion 714 of the shaft 700 in the threads of the insulating holder 726, the holder and the supported core 200 are moved along the axis of the transformer. This, as noted above, reduces the air gap in the magnetic path around one of the coil forms 736 and 738, and it increases the air gap for the magnetic paths around the other coil form. Adding the resulting unequal secondary voltages gives a transformer output voltage equal to the voltage difference and of the phase of the stronger of the two.

The transformer output voltage is utilized by the control circuit 208 of Figure 2 to control the servomotor 38. For example, this voltage may be amplified and converted to a direct voltage by a ring demodulator in the control circuit 208. The resulting direct voltage may then be introduced to a resistance-capacity network designed to keep the servomotor 38 from hunting, and it may then be used to control a 60-cycle square wave push-pull modulator. The push-pull modulator output may be amplified and fed to a pair of push-pull cathode follower driver stages which drive the control grids of a pair of power output tubes. The power output tubes may be controlled by a sinusoidal direct-current signal introduced to their anodes to function as a synchronous detector. This latter signal is synchronized with the output of the cathode follower driver stages which are controlled by the secondary voltage from the transformers 202 and 204. The positive-going cycles of the sinusoidal signal allow a current wave of the same shape to pass through one of the power output tubes when its control grid is driven positive by the driving square wave. The other half-cycles of the sinusoidal signal will cause conduction in the other output tube.

In the manner described in the preceding paragraphs, the output transformer of the control circuit 208 develops across its secondary an output voltage which has a phase and magnitude dependent upon the relative phases of the signals introduced to the two output tubes. Since the two tubes operate on a push-pull basis, varying the relative phases of the input signals to the tubes produces corresponding variations in the output from the tubes. The variations in the phases of the signals are dependent on the position of the core 200 of the differentially-tuned transformers 202 and 204. The output voltage is applied across the control winding of a two-phase A.C. servomotor to drive the load 210 and also to drive the servomotor feedback shaft 744 in the required direction.

The control circuitry suggested above is well known and conventional. For that reason, it is believed sufficient that the control circuit for the servomotor 38 be shown merely by the block 208. When desired, other known types of control circuits can be used for this purpose.

When the core 200 of the differential transformers 202 and 204 is driven to the right of its null position in Figure 7, the feedback shaft 744 will be rotated in the direction which will move the holder 726 along the portion 714 of the shaft 700 to return the core 200 to the left in Figure 7 and recenter the core at its null position. Therefore, the servomotor 38 is slaved to the rotor 170 of the counter 150. That is, any rotation of the rotor 170 tends to move the core 200 to the right or to the left in Figure 7. Such movement of the core causes the servomotor 38 to be energized, and its subsequent rotation causes the core 200 to be moved back to its null point. Therefore, any angular position taken by the rotor 170 causes the servomotor 38 to rotate until it also assumes the same angular position. Furthermore, various members including the shaft 700, the core 200, and the feedback shaft 744 and pin 746 can be considered to constitute a mechanical register coupled to the counter 150 and to the load 210 to detect any differences between the rotary position of the counter and load.

Normally, the rotary position differences between the feedback shaft 744 and the shaft 700 does not exceed 15 degrees. However, the feedback shaft could lag or overshoot the counter shaft by as much as 5 revolutions before control is lost. This causes one of the two rotation limiters 712 and 760 to stall the rotor 170 by preventing relative rotation between the counter shaft 700 and the holder 726. To prevent damage to the rotation limiters in case of servomotor circuit failure or gross servomotor overload, the clutch including the friction drive plate 748 is used to drive the holder 726.

The invention provides, therefore, an improved system for controlling the rotation of a servomotor in accordance with data recorded in digital form on a recording medium such as a magnetic tape. As described above, a series of pulses corresponding to clockwise rotation of the controlled servomotor and another series of pulses corresponding to counterclockwise rotation of the motor are recorded in separate channels on the tape. These pulses are fed to a unique and improved digital-to-angular converter so that the pulses may be converted into corresponding angular positions of the rotor of the converter. A unique and improved coupler is then used to couple the converter, which is not capable of developing appreciable torques, to the servomotor. The system is such that the servomotor is precisely slaved to the rotor of the converter, and the converter in turn is accurately controlled by the digital data recorded on the recording medium.

As noted previously, the invention finds wide utility in the control of machine tools. With such a control, duplicate apparatus is used to control individual servomotors when two or a plurality of servomotors are used. The servomotors, in turn, control ordinate and co-ordinate movements of a work table. This control of the work table enables a predetermined series of operations to be repeated on a plurality of workpieces which are placed in succession on the work table.

The control may occur along a plurality of axes having any particular relationship to one another in accordance with the work to be performed. The control may be exerted simultaneously on a plurality of work-tables co-ordinated to produce any desired output function. The control may be exerted over work-tables movable in linear or rotary directions or in any other desired directions. The control may also be provided over other types of output mechanisms in addition to work-tables.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A system for controlling the movement of a mechanism in response to a series of input pulses each representing increments in the positioning of the mechanism, said system including: a counter having a rotor and further having a plurality of stator windings angularly spaced about the axis of rotation of the rotor for obtaining a movement of the rotor in accordance with the particular stator windings energized, means including an electrical network coupled to the stator windings for individually energizing said stator windings in response to the input pulses to produce rotation of the rotor in accordance with the individual energizing of the stator windings, means responsive to the input pulses for introducing the input pulses to said electrical network and means for coupling said rotor to the mechanism to be controlled to obtain a movement of such mechanism in accordance with the rotation of said rotor.

2. A system for controlling the movement of a mechanism in accordance with first and second sets of control pulses respectively representing movements in first and second opposite directions, said system including: a counter having a rotor and further having a plurality of stator windings angularly spaced about the axis of rotation of the rotor to obtain a movement of the rotor in accordance with the particular stator windings energized, means including an electrical network coupled to the stator windings and responsive to the pulses in the first and second sets for successively energizing said stator windings in a clockwise direction in response to the first set of control pulses and for successively energizing said stator windings in a counterclockwise direction in response to the second set of control pulses to produce clockwise and counterclockwise rotation of the rotor in accordance with the pulses in the first and second sets, respectively, and means for coupling said rotor to the mechanism to be controlled to obtain a movement of such mechanism in accordance with the rotation of said rotor.

3. A system for controlling the movement of a mechanism in accordance with first and second sets of pulses respectively representing movements in first and second opposite directions, said system including: a counter having a rotor and further having a plurality of pairs of diametrically opposed stator coils angularly spaced about the axis of rotation of the rotor, means including an electrical network having a number of positions of stability corresponding to the number of pairs of stator coils and coupled to the stator coils for successively energizing said stator coil pairs in a clockwise direction in response to the first set of control pulses and for successively energizing said stator coil pairs in a counterclockwise direction in response to the second set of control pulses to obtain respective clockwise and counterclockwise rotation of the rotor, and means for coupling said rotor to the mechanism to be controlled to obtain a movement of such mechanism in accordance with the rotation of said rotor.

4. A system for controlling the rotation of a mechanism in response to at least one set of pulses, said system including: a converter responsive to the pulses for changing the pulses into corresponding rotational motion, differential transformer means having a core element and windings and mechanically coupled to said converter for movement of said core element relative to said windings in accordance with the rotational motion from said converter to obtain the production by said transformer means of an output signal having an amplitude and phase dependent upon the relative movement between said core element and said windings, and means including a control circuit responsive to the output signal from said differential transformer means to obtain a movement of the mechanism to be controlled in accordance with the phase and amplitude of the output signal.

5. In combination for response to signal information representing a desired movement in digital form: a mechanism to be controlled in movement, a converter responsive to the signal information for obtaining a motion of the converter in accordance with the signal information, a coupler mechanically coupled to said converter for converting the motion of the converter into an electrical control signal having characteristics related to the motion, and means including a control circuit coupled to said coupler for obtaining a movement of the mechanism in accordance with the characteristics of the electrical control signal developed by said coupler.

6. In combination for response to signal information representing a desired movement in digital form: a mechanism to be controlled in movement, a converter for changing the signal information into a corresponding motion of the converter, means including a coupler mechanically coupled to said converter for developing an output signal having an amplitude and phase corresponding to the rotational motion of said converter, and means including a control circuit coupled to said converter and responsive to the output signal to obtain a movement of the mechanism in accordance with the amplitude and phase of the output signal.

7. In combination: servo means, source means for providing control pulses to represent particular digital information, a converter responsive to the control pulses for charging the control pulses from said source means into mechanical motion representing the particular digital information, differential transformer means including a core element and windings and mechanically coupled to said servo means and to said converter for movement of said core element relative to said windings in accordance with the motion of said converter to obtain the production by said transformer of an output signal having a phase and amplitude related to said converter motion, control means responsive to the phase and amplitude of the output signal from said differential transformer means and operative upon said servo means to obtain said movement in a direction for reducing the amplitude of the output signal from said transformer, and an output mechanism coupled to said control means for movement in accordance with the phase and amplitude of said output signal.

8. In combination: servo means, means for providing control pulses to represent particular digital information, a converter responsive to the control pulses for changing the control pulses from said source into rotational motion representing the particular digital information, differential transformer means having a core element and windings and mechanically coupled to said converter for displacement of said core element relative to said windings in response to rotational motion of said converter to obtain the production by said transformer means of an output signal having a phase and amplitude related to the rotational motion of the converter, control means responsive to the output signal from said differential transformer means to obtain an operation of said servo means in accordance with the phase and amplitude of the output signal, and feedback means mechanically coupling said servo system to said core element to return said core element to a null point in accordance with the operation of said servo means.

9. In combination: rotational servo means, means for providing discrete sets of first and second control pulses to represent particular digital information corresponding to movements in first and second opposite directions, a counter responsive to said control pulses for producing corresponding clockwise and counterclockwise rotational motion, differential transformer means having a core element and windings and mechanically coupled to said counter for movement of said core element relative to said windings reciprocally from a null position in response to rotational motion of said counter to obtain the production by said transformer means of an output signal having a phase and amplitude dependent upon the rotational motion of the counter, control means responsive to the phase and amplitude of the output signal from said differential transformer means to control the clockwise and counterclockwise rotation of said servo means, and feedback means mechanically coupling said servo means to said core element to return the relative displacement between the core element and windings to the null position in response to the clockwise and counterclockwise rotation of said servo means.

10. A system for controlling the movement of a mechanism in accordance with discrete sets of first and second data representing incremental movements in first and second opposite directions, including, a differential transformer having windings and a core element linearly movable relative to the windings for the production in the windings of an output voltage having an amplitude and phase dependent upon such relative movement, a rotary lead screw coupled to the transformer to produce a linear displacement of the core element relative to the windings in accordance with the rotary movements of the lead screw, means responsive to the discrete sets of data and coupled to the rotary lead screw to produce a rotary movement of the lead screw in accordance with the information represented by the data, and servo means coupled to the mechanism and responsive to the voltage from the differential transformer to produce a movement of the mechanism in accordance with the phase and amplitude of the output voltage and to produce a relative movement between the core element and the windings in the differential transformer to reduce the amplitude of the output voltage in accordance with the movement of the mechanism.

11. A system for controlling the movement of a mechanism in accordance with discrete sets of first and second data representing movements in first and second opposite directions, including, means including a rotary member responsive to the data to convert the data into rotational movements of the member, means including a differential transformer having a core element and windings movable on a relative basis in an axial direction for the production of an output voltage in accordance with such relative movement from a null position and coupled to the rotary member for an axial movement related to the rotary movement of the rotary member, servo means coupled to the differential transformer for driving the mechanism in accordance with the output signal developed by the transformer, and feedback means coupled to the servo means and responsive to the operation of the servo means for obtaining a relative movement between the core element and the windings in a direction to reduce the output voltage from the differential transformer.

12. A system for controlling the movement of a mechanism in accordance with discrete first and second sets of pulses respectively representing movements in first and second opposite directions, including, a rotary member, counter means responsive to successive pulses in a first one of the sets for producing movements of the rotary member in particular increments in one direction and responsive to successive pulses in the second set for producing movements of the rotary member in the particular increments in the opposite direction, means including a differential transformer having a core element and windings movable relative to one another and coupled to the rotary member for axial movement in opposite directions in accordance with the rotary movements of the rotary member and responsive to such movements to produce output signals having an amplitude and phase related to the movements, servo means including a servomotor responsive to the output signals to drive the mechanism in accordance with the amplitude and phase of the output signals, and mechanical feedback means coupled to the servomotor and responsive to the operations of the servomotor to obtain a relative movement between the core element and the windings in accordance with the operation of the servomotor and in a direction for reducing the amplitude of the output signals.

13. In combination for response to first and second sets of control pulses, driving means having a rotor and a stator and further having a plurality of stator coils angularly spaced about the axis of rotation of the rotor, and means including a ring counter coupled to the stator coils for successively energizing said stator coils in a clockwise direction in response to the first set of control pulses and for successively energizing said stator coils in a counterclockwise direction in response to the second set of control pulses to produce clockwise and counterclockwise rotation of said rotor in accordance with the pattern of introduction of said control pulses in the first and second sets.

14. In combination for response to first and second sets of control pulses, driving means having a rotor and a stator and further having a plurality of stator coils angularly spaced about the axis of rotation of the rotor to control the relative movements between the rotor and the stator in accordance with the energizing of the coils, means coupled to the stator coils for successively energizing said stator coils and including a plurality of bistable members each having first and second states of operation, and control circuitry connected to receive the control pulses and including a plurality of gate means intercoupling individual ones of said bi-stable members to cause successive ones of the control pulses to trigger said bistable members in sequence between said first and second states for an energizing of said stator coils in a predetermined sequence.

15. In combination, means for providing signals representing an input value, motor means including a threaded shaft for converting the input signals into corresponding rotary motions of the shaft, a paramagnetic core, means including the core threadedly coupled to the shaft for linear motion along the shaft in accordance with the rotary movements of the shaft, and a differential transformer including the core and a pair of differentially connected windings disposed relative to the core for the production by the transformer of a signal having at any instant characteristics related to the linear movements of the core relative to the windings.

16. A system for controlling the movements of an output mechanism in response to discrete sets of pulse data, including, motor means responsive to the pulse data for converting the pulse data into mechanical motion related to the data, a mechanical register differentially coupled to the motor means and to the output mechanism for response in accordance with differences in the movements of the motor means and the output mechanism, generating means coupled to the mechanical register for the production at any instant of signals related to any differences in motion detected by the mechanical register, means coupled to the generating means for driving the output mechanism in accordance with the generated signals, and feedback means coupled to the last mentioned means and to the register for driving the register in a direction for reducing the differences in the response provided by the register in accordance with the operation of the last mentioned means.

17. In combination for controlling the movements of an output mechanism, means for providing first pulses representing desired movements of the output mechanism in a first direction and for providing second pulses representing desired movements of the output mechanism in a second direction opposite to the first direction, means including a mechanical counter coupled to the pulse means for converting the first pulses into mechanical movements in one direction and for converting the second pulses into mechanical movements in the opposite direction, means including a mechanical register coupled to the mechanical counter for detecting differences in the motions of the mechanical counter and the output mechanism, means including electrical generating means coupled to the mechanical register for producing signals having at any instant an amplitude dependent upon the differences in the motions for the mechanical counter and the output mechanism and having at any instant a phase dependent upon the position of said mechanical counter relative to said output mechanism, means including a servomotor for driving the output mechanism in accordance with the phase and amplitude of the signal produced by the electrical generating means, and means including feedback means coupled to the servomotor and the mechanical register for driving the register in accordance with the operation of the servomotor in a direction for reducing differences in the motions detected by the register.

18. A system for controlling the movements of an output mechanism in response to discrete sets of pulse data, including motor means for converting the pulse data into rotary motion related to the data, a mechanical register including a rotary shaft and differentially coupled to the motor means and the output mechanism and responsive to detect any differences between the movements of the motor means and the movements of the output mechanism, said mechanical register including means mounted for linear movement in accordance with any differences in movement detected by the register and responsive to such linear movement to produce output signals having characteristics related to the linear movement, means including a servomotor coupled to the output signal means for driving the output mechanism in accordance with the characteristics of the output signals, and means including feedback means coupled to the servomotor for driving the mechanical register in accordance with the movements of hte servomotor and in a direction to reduce any differences detected by the mechanical register.

19. A system as set forth in claim 18 in which the pulse data is represented by discrete electrical input pulses and in which the motor means includes a magnetic stepping motor for rotating through an angular increment in response to each of the electrical input pulses and in which the output signal means includes a differential transformer coupled to the rotary shaft in the mechanical register to produce an output signal having at any instant an amplitude related to the magnitude of the mechanical difference detected by the register and having a phase dependent upon the polarity of this mechanical difference.

20. In combination, a differential transformer including first and second windings and including a magnetic core coupled to the windings for the production by the windings of signals having differences in characteristics in accordance with the disposition of the core relative to the windings, driving means for providing rotary movements related to input values and coupled to the differential transformer for converting the rotary movements into corresponding linear movements of the windings relative to the core in the differential transformer, a load, motor means coupled to the differential transformer for driving the load in accordance wtih the signals generated by the transformer, and feedback means coupled to the motor means for receiving a rotary movement in accordance with the operation of the motor means and coupled to the differential transformer for producing a linear movement of the windings relative to the core in the transformer in accordance with the rotary movements of the feedback means and in a direction for reducing the signal generated by the transformer.

21. In combination, a differential transformer including a magnetic core and at least a pair of differentially connected windings for providing a signal having an amplitude related to the relative displacement between the core and the windings from a null position, a shaft threadedly coupled to the transformer for producing a relative displacement between the core and the windings in the transformer in accordance with the rotary movements of the shaft, means for receiving input signals and coupled to the shaft for producing a rotary movement of the shaft in accordance with the characteristics of the input signals, motor means coupled to the differential transformer for operation at any instant in accordance with the characteristics of the signal generated by the transformer, and means including a load coupled to the motor to be driven at any instant in accordance with the operation of the motor.

22. In combination, a differential transformer including a magnetic core and at least a pair of differentially connected windings for providing a signal having a phase related to the direction of relative displacement between the core and windings from a null position and having an amplitude related to the magnitude of this relative displacement, a shaft threadedly coupled to the transformer for producing a relative displacement between the core and windings in the transformer in accordance with the rotary movements of the shaft, means for receiving first input signals representing desired movement of the shaft in one direction and second input signals representing a desired movement of the shaft in the opposite direction and coupled to the shaft for producing rotary movements of the shaft in opposite directions in accordance with the reception of the first and second signals, servomotor means coupled to the differential transformer for operation at any instant in accordance with the phase and amplitude of the signal generated by the transformer, means including a load coupled to the servomotor to be driven at any instant in accordance with the operation of the servomotor, and feedback means coupled to the servomotor for driving the shaft in accordance with the operation of the servomotor and in a direction to minimize the amplitude of the signals generated by the transformer.

23. In combination, driving means having a rotor and a stator and further having a plurality of stator coils angularly spaced about the axis of rotation of the rotor to control the relative rotary disposition of the stator and the rotor in accordance with the particular stator coils energized, means including a plurality of bi-stable members each having first and second stable operating conditions and coupled to the stator coils for controlling the energizing of the stator coils in accordance with the states of operation of the bi-stable members, a first control circuit including a first plurality of gate means intercoupling individual ones of said bi-stable members to cause successive input pulses introduced to said first control circuit to trigger said bi-stable members in sequence between said first and second operating conditions to energize said stator coils in a first predetermined sequence for a relative rotation between said rotor and stator in one direction, and a second control circuit including a second plurality of gate means intercoupling individual ones of said bi-stable members to cause successive input pulses introduced to said second control circuit to trigger said bi-stable members in sequence between said first and second operating conditions to energize said stator coils in a second sequence opposite from said first sequence for a relative rotation between said rotor and stator in an opposite direction.

24. In combination, driving means having a rotor and a stator and further having a plurality of stator coils angularly spaced about the axis of rotation of the rotor, a plurality of driver stages for energizing respective ones of said stator coils in accordance with the energizing of the driver stages, a plurality of bi-stable members connected to respective ones of said driver stages and each having first and second stable operating states for controlling the energizing of said driver stages, a first input circuit and a second input circuit connected to said bi-stable members, a first network connected between said driver stages and said bi-stable members and including a first plurality of gates to cause successive input pulses introduced to said first input circuit to trigger said bi-stable members in a first sequence between said first and second operating states for an activation of said driver stages in a first predetermined sequence to obtain a relative rotary motion between said stator and said rotor in a first direction, and a second network connected between said driver stages and said bi-stable members and including a second plurality of gates to cause successive input pulses introduced to said second input circuit to trigger said bi-stable members between said first and second operating states in a second sequence opposite to said first sequence for an activation of said driver stages in a second predetermined sequence opposite to said first sequence to obtain a relative rotary motion between said stator and said rotor in a direction opposite to the first direction.

25. In combination, a first annular member having a plurality of magnetic poles disposed at spaced intervals around the annular periphery of the member, a second annular member having a plurality of magnetic poles disposed at spaced intervals around the annular periphery of the member and disposed for rotation relative to the first member and having its poles disposed in magnetically coupled relationship to the poles on the first member, a plurality of windings each disposed on a different one of the poles on the first member to produce flux in the poles upon energizing of the windings, control means connected to the windings to obtain at any instant an energizing of at least a leading winding and a lagging winding in the direction of relative movement of the members, and means coupled to the control means for introducing successive pulses to the control means to retain, upon the introduction of each pulse, the energizing of the leading winding of the pair previously energized and to substitute a winding ahead of the leading winding in the direction of relative movement of the members for the lagging winding in the pair previously energized.

26. In combination, a first annular member having a plurality of poles made from magnetic material and disposed at spaced positions along the periphery of the member, a second annular member having a plurality of poles made from magnetic material and different from the number of poles in the first member and disposed at spaced positions around the periphery of the member, the second annular member being disposed in concentric and rotable relationship to the first member, a plurality of windings each disposed on a different one of the poles on the first member to produce magnetic flux in the associated pole for linking the first member upon the energizing of the winding, control means connected to the windings to obtain at any instant an energizing of a pair of spaced windings in the plurality for a positioning of the first member relative to the second members in accordance with the particular pair of windings energized, means for providing first pulses representing increments of one polarity and second pulses representing increments of an opposite polarity, and means coupled to the pulse means and the control means for retaining the energizing of a first of the windings in the pair energized at any instant and for substituting the energizing of a third winding leading the energized pair of windings in the direction of desired relative movement of the members and for substituting the third winding to replace the energizing of the second winding in the energized pair upon the introduction of one of the first pulses and for retaining the energizing of the second winding in the pair upon the introduction of one of the second pulses and for substituting the energizing of a fourth winding leading the energized pair of windings in the direction of desired relative movement of the members and for substituting the fourth winding to replace the energizing of the first winding in the energized pair upon the introduction of one of the second pulses.

27. A system for controlling the movements of an output mechanism in response to discrete sets of pulse data, including, converter means responsive to the pulse data for converting the pulse data into an operation of the converter means in accordance with the data, means including a shaft coupled to the converter means for obtaining a rotation of the shaft in accordance with the operation of the converter means, means coupled to the shaft for producing an electrical signal having characteristics related to the rotational position of the shaft, and servo means responsive to the electrical signal and coupled to the output mechanism and to the electrical signal producing means for obtaining a movement of the output mechanism and of said electrical signal producing means in accordance with the characteristics of the output signal to offset the movement of said electrical signal producing means produced by said shaft rotation.

28. A system for controlling the movements of an output mechanism in response to first and second discrete sets of pulse data representing incremental movements in first and second opposite directions, including, converter means including electrical circuitry responsive to the pulse data in the first and second sets and including a shaft for obtaining incremental rotary movements of the shaft in first and second opposite directions in accordance with the pulses in the first and second sets, means including a movable member and electrical circuitry responsive to the rotary movements of the shaft for producing an electrical control signal having an amplitude representing the displacement of said movable member from a null position and having a phase representing the direction of such displacement, and means including a servo motor responsive to the phase and amplitude of the control signal and coupled to the output mechanism and to said movable member for driving said movable member in a direction and through a distance related to the phase and amplitude of the control signal to reduce the amplitude of said control signal.

References Cited in the file of this patent

UNITED STATES PATENTS

| | | |
|---|---|---|
| 2,537,427 | Seid et al. | Jan. 9, 1951 |
| 2,630,552 | Johnson | Mar. 3, 1953 |
| 2,715,703 | Schuch | Aug. 16, 1955 |
| 2,878,435 | Rich et al. | Mar. 17, 1959 |